United States Patent
Carvey et al.

(10) Patent No.: US 6,606,656 B2
(45) Date of Patent: *Aug. 12, 2003

(54) APPARATUS AND METHODS FOR CONNECTING MODULES USING REMOTE SWITCHING

(75) Inventors: Philip P. Carvey, Bedford, MA (US); William J. Dally, Stanford, CA (US); Larry R. Dennison, Norwood, MA (US)

(73) Assignee: Avici Systems, Inc., N. Billerica, MA (US)

(*) Notice: Subject to any disclaimer, the term of this patent is extended or adjusted under 35 U.S.C. 154(b) by 49 days.

This patent is subject to a terminal disclaimer.

(21) Appl. No.: 09/765,138

(22) Filed: Jan. 18, 2001

(65) Prior Publication Data

US 2002/0016901 A1 Feb. 7, 2002

Related U.S. Application Data

(63) Continuation of application No. 09/083,722, filed on May 22, 1998, now Pat. No. 6,205,532.

(51) Int. Cl.[7] ........................ G06F 15/177; G06F 15/00; G06F 15/76; H01R 12/16
(52) U.S. Cl. ........................ 709/220; 709/221; 709/239; 361/731; 361/736; 361/788; 712/15
(58) Field of Search ........................ 709/203, 220, 709/221, 228, 239; 710/104, 316, 38; 712/1, 11, 15, 10; 361/785, 788, 728, 731, 736, 737, 748, 767, 828

(56) References Cited

U.S. PATENT DOCUMENTS

| 4,118,094 A | 10/1978 | Key .......................... 339/75 |
| 4,340,092 A | 7/1982 | Chisholm ................... 140/147 |
| 4,371,013 A | 2/1983 | Camp ......................... 140/147 |
| 4,469,388 A | 9/1984 | Narozny ....................... 339/45 |
| 4,631,637 A | 12/1986 | Romania et al. ........... 361/413 |
| 4,861,274 A | 8/1989 | Brune et al. ................ 439/189 |
| 4,911,645 A | 3/1990 | August et al. ................ 439/75 |
| 4,933,933 A | 6/1990 | Dally et al. .................. 370/60 |

(List continued on next page.)

OTHER PUBLICATIONS

Glass, C.J., and Ni, L.M., "The Turn Model for Adaptive Routing," *Proc. 19th Internat. Symposium on Computer Architecture*, 278–287 (May 1992).

(List continued on next page.)

*Primary Examiner*—Frantz B. Jean
(74) *Attorney, Agent, or Firm*—Hamilton, Brook, Smith & Reynolds, P.C.

(57) ABSTRACT

A module connection assembly connects modules in a torus configuration that can be changed remotely. In particular, a single module can be added to or deleted from the configuration by remotely switching from conducting paths that provide end-around electrical paths to conducting paths that provide pass-through electrical paths. The assembly includes two backplanes, a first set of module connectors for electrically connecting modules to one of the backplanes, and a second set of module connectors for electrically connecting modules to the other backplane. The assembly further includes configuration controllers. Each configuration controller selects between end-around electrical paths that electrically connect multiple module connectors of the first set to each other, and pass-through electrical paths that electrically connect module connectors of the first set to module connectors of the second set. Each configuration controller operates as a remotely configurable switch that configures a topology formed by the backplanes and the module connectors. In particular, by adding a single module, the topology can be expanded incrementally.

35 Claims, 18 Drawing Sheets

U.S. PATENT DOCUMENTS

| | | | |
|---|---|---|---|
| 5,088,091 A | | 2/1992 | Schroeder et al. .......... 370/94.3 |
| 5,123,848 A | | 6/1992 | August et al. ................. 439/66 |
| 5,134,690 A | | 7/1992 | Samatham ................... 395/200 |
| 5,144,691 A | | 9/1992 | August et al. ................. 385/88 |
| 5,155,784 A | | 10/1992 | Knott ........................... 385/88 |
| 5,172,371 A | | 12/1992 | Eng et al. ...................... 370/60 |
| 5,261,827 A | | 11/1993 | Lenzi et al. ................... 439/78 |
| 5,325,270 A | | 6/1994 | Wenger et al. ............... 361/797 |
| 5,349,343 A | | 9/1994 | Oliver ................... 340/825.52 |
| 5,352,123 A | * | 10/1994 | Sample et al. ................. 439/61 |
| 5,408,469 A | | 4/1995 | Opher et al. ............... 370/60.1 |
| 5,425,169 A | | 6/1995 | Steinman et al. ............. 29/758 |
| 5,444,701 A | | 8/1995 | Cypher et al. ................. 370/60 |
| 5,521,591 A | | 5/1996 | Arora et al. ................. 340/826 |
| 5,522,046 A | | 5/1996 | McMillen et al. .......... 709/200 |
| 5,530,811 A | * | 6/1996 | Benton et al. ............... 710/300 |
| 5,530,842 A | * | 6/1996 | Abraham et al. ........... 709/221 |
| 5,532,856 A | | 7/1996 | Li et al. ....................... 359/118 |
| 5,533,201 A | * | 7/1996 | Benton et al. ............... 710/100 |
| 5,581,705 A | | 12/1996 | Passint et al. ......... 395/200.13 |
| 5,583,990 A | | 12/1996 | Birrittella et al. ....... 395/200.01 |
| 5,603,044 A | * | 2/1997 | Annapareddy et al. ..... 710/301 |
| 5,617,577 A | | 4/1997 | Barker et al. ................ 395/800 |
| 5,625,780 A | * | 4/1997 | Hsieh et al. ................. 710/316 |
| 5,646,373 A | * | 7/1997 | Collins et al. ............... 174/252 |
| 5,649,100 A | * | 7/1997 | Ertel et al. ................... 709/225 |
| 5,659,716 A | | 8/1997 | Selvidge et al. ............ 395/500 |
| 5,659,796 A | | 8/1997 | Thorson et al. ........ 395/200.71 |
| 6,188,675 B1 | * | 2/2001 | Casper et al. ............... 370/254 |

OTHER PUBLICATIONS

Rettberg, R., et al., "Development of a Voice Funnel System: Design Report," Bolt Beranek and Newman, Inc., Report No. 4098, 149 pages (Aug. 1979).

Dally, William, "Network and Processor Architecture for Message–Driven Computers." In *VLSI and Parallel Computation*, Suaya, R., and Birtwistle, G., eds. (San Mateo, CA:Morgan Kaufman), pp. 140–222 (1990).

Dally, William J., "Virtual–Channel Flow Control," *IEEE Transactions on Parallel and Distributed Systems*, 3 (2) :194–205 (Mar. 1992).

Dally, W.J., and Seitz, C.L., "The torus routing chip," *Distributed Computing*, 1:187–196 (1986).

Jesshope, Chris, "The MP1 Chip and its Application," Dept. of Electronic and Electrical Engineering, Univ. of Surrey, Guildford, Surrey GU2 5XH, UK, 47–54.

Kessler, R.E., and Schwarzmeier, J.L., "Cray T3D: A New Dimension for Cray Research," IEEE, 1063–6390/93, 176–182 (1993).

Dally, William et al., "Deadlock–Free Message Routing in Multiprocessor Interconnection Networks," *IEEE Transactions on Computers*, C–36 (5) :547–553 (May 1987).

Jesshope, C., and Izu, C., "The MP1 Network Chip," IEEE, 1066–6192/92, 338–348 (1992).

Dally, William J., et al., "The Reliable Router: A Reliable and High–Performance Communications Substrate for Parallel Computers," *Proc. of Parallel Computer Routing and Communication Workshop*, Seattle, WA, 241–255 (May 1994).

Dally, W.J., et al., "Architecture and Implementation of the Reliable Router," *Proc. of Hot Interconnects II*, Stanford, CA, 122–133 (Aug. 11–13, 1994).

Nuth, P.R., and Dally, W.J., "The J–Machine Network," *Proc. of the Internat. Conference on Computer Design: VLSI in Computers and Processors*, Cambridge, MA, 420–423 (Oct. 1992).

Dennison, Larry R., "The Reliable Router: An Architecture for Fault Tolerant Interconnect," doctoral dissertation, Massachusetts Institute of Technology, Cambridge, MA, 444 pages (Jun. 1996).

Stunkel, C.B., et al., "The SP2 High–Performance Switch," IBM Systems Journal, vol. 34, No. 2, 19985, pp. 184–204.

* cited by examiner

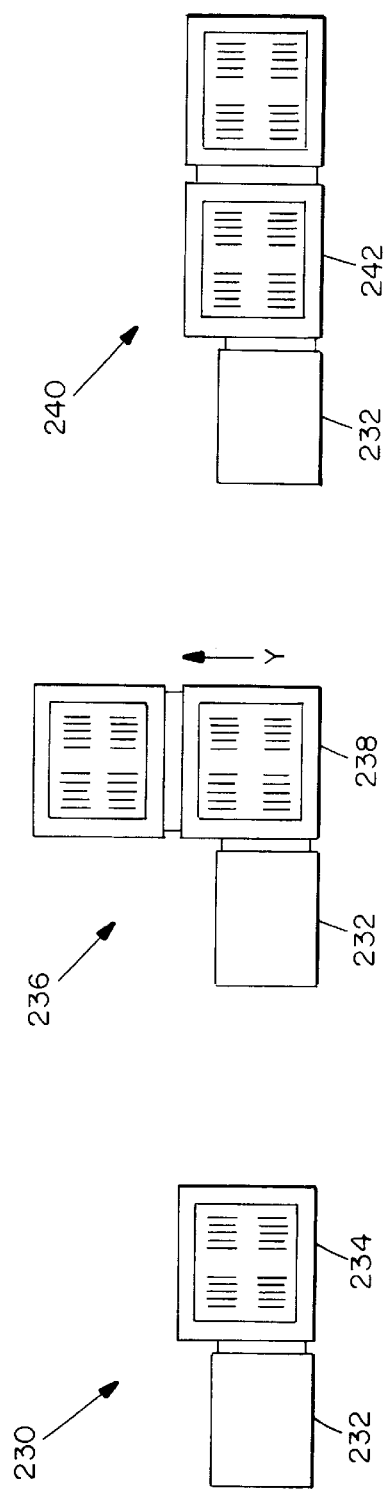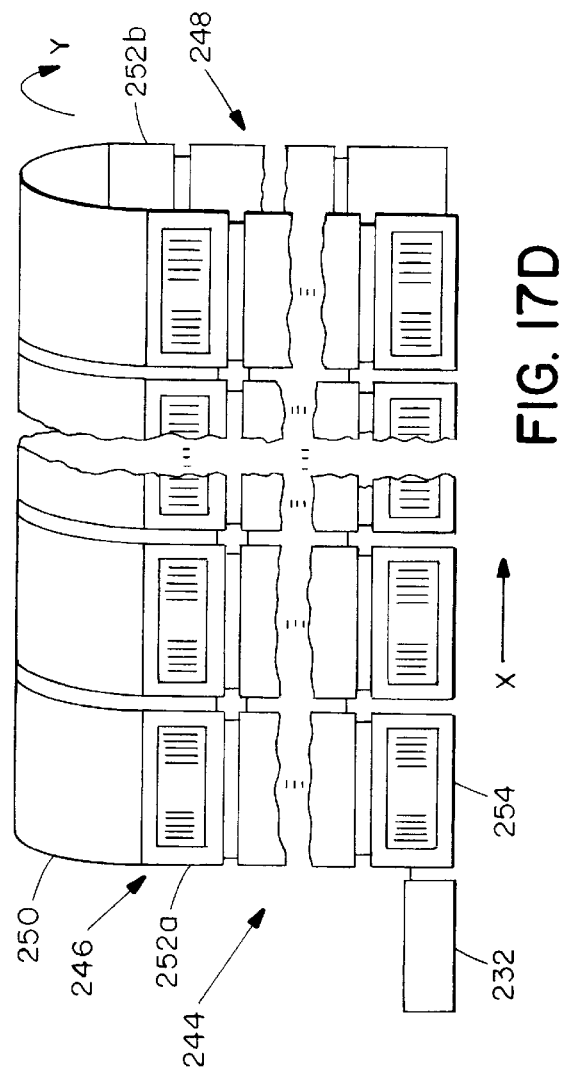

APPARATUS AND METHODS FOR CONNECTING MODULES USING REMOTE SWITCHING

RELATED APPLICATION(S)

This application is a continuation of application Ser. No. 09/083,722, filed May 22, 1998 now U.S. Pat. No. 6,205,532. The entire teachings of the above application is incorporated herein by reference.

BACKGROUND OF THE INVENTION

Computer systems come in a variety of topologies. Systems that include multiple data processing modules (or nodes) often have complex topologies. The interconnection assemblies that connect the modules of such topologies are often complicated, as well. In particular, it is a demanding task for an interconnection assembly to provide several connections (or links) to each module, as required by certain systems having mesh-shaped and torus-shaped configurations.

A typical multi-module computer system has an interconnection assembly that includes a backplane, module connectors and flexible wire cables. The backplane is a rigid circuit board to which the module connectors are mounted. Each module is a circuit board that electrically connects with the backplane when plugged into one of the mounted module connectors. The flexible wire cables connect with the backplane to configure the system into a network topology having a particular size.

The network topology of a typical multi-module computer system is expandable by adding another backplane and reconnecting the flexible wire cables to configure the system into a larger network topology. Generally, the topology of the system is expanded by several modules at a time. For example, one such system having a 4×4×4 torus topology is expanded by adding a 16-module backplane and reconnecting the flexible wire cables to expand the system to a 4×4×5 torus topology. As another example, in a system having 2-D mesh topology, the minimum unit of expansion is a backplane that adds four modules to the system. Some systems permit expansion by hot-plugging, i.e., plugging and unplugging cables to expand the topology of the system while the power remains on.

Examples of some conventional systems that are expandable by several modules at a time are the Paragon made by Intel Corp., of Santa Clara, Calif., and the Cray T3D/T3E made by Cray Research Corp., of Eagan, Minn.

SUMMARY OF THE INVENTION

Conventional multi-module systems generally do not allow incremental expansion in units of single modules. Rather, such systems typically expand by increasing the topology to the next largest regular network (e.g., adding a 16-module backplane and reconnecting cables to expand a system from a 4×4×4 torus topology to a 4×4×5 torus topology).

In general, the poor extensibility of conventional machines is due to two factors. First, it is often a laborious and error prone process to expand the system at all. Hence, cabled systems are expanded generally by several modules at a time to avoid having to expand the system again in the near future. Second, some conventional machines also employ regular routing algorithms, such as e-cube (or dimension-order) routing, that only work in a regular (complete) torus or mesh network. Accordingly, such systems could not be expanded incrementally.

The present invention is directed to techniques for incrementally expanding the topology of a multi-module system by connecting modules in a configuration, and changing the configuration remotely. That is, a single module can be added or deleted from the configuration by remotely switching from conducting paths that provide end-around electrical paths (i.e., paths connecting to a single backplane) to conducting paths that provide pass-through electrical paths (i.e., paths extending between two backplanes). Accordingly, the topology of the system can be incrementally changed by a single module by remotely switching conducting paths.

Preferably, the configuration has the capability to take the form of a logical three-dimensional torus. A true torus is at least three modules deep in each dimension, coupled in a loop. When the depth of the configuration drops below three modules in at least one dimension, the configuration is considered a degenerate torus. For simplicity, the term "torus" is used hereinafter to refer to either a true torus (one that is at least three modules deep in each dimension) or a degenerate torus (one that is less than three modules deep in at least one dimension).

A preferred module connection assembly that is suitable for the invention includes two backplanes, a first set of module connectors for electrically connecting modules to one of the backplanes, and a second set of module connectors for electrically connecting modules to the other backplane. The assembly further includes configuration controllers. Each configuration controller selects between end-around electrical paths that electrically connect multiple module connectors of the first set to each other, and pass-through electrical paths that electrically connect module connectors of the first set to module connectors of the second set.

Each configuration controller may operate as a remotely configurable switch that configures a topology formed at least in part by the backplanes and the module connectors. Each configuration controller may include a configuration board that moves between an end-around position connecting nodes on a common backplane and a pass-through position connecting nodes on two backplanes. The configuration controller may further include an actuator that moves the configuration board between the end-around position and the pass-through position. In one embodiment, the actuator is remotely controlled according to an actuator signal.

The assembly may further include a backplate that physically supports the first and second backplanes such that the configuration board is disposed between the backplate and the two backplanes.

Preferably, each configuration board includes end-around pads that electrically connect with the end-around electrical paths, and pass-through pads that electrically connect with the pass-through electrical paths. The backplanes preferably include backplane pads that electrically connect with their respective module connectors. The end-around pads of the configuration board align with the backplane pads of the first backplane when the configuration board is in the end-around position. Similarly, the pass-through pads of the configuration board align with the backplane pads of the first and second backplanes when the configuration board is in the pass-through position.

Each of the end-around and pass-through electrical paths may be cableless paths formed exclusively of rigid metallic material. The paths may be made exclusively of etch, contacts, and springs.

Each backplane provides conducting paths formed preferably of similar rigid metallic material. The conducting paths of the backplanes and the configuration boards combine to form links that connect module connectors of the same backplane when the configuration boards are in their end-around positions, and different links that connect module connectors of different backplanes when the configuration boards are in their pass-through positions. When one configuration board is moved from its end-around position to its pass-through position, at least one module connector is added to the topology. In particular, one end-around link is broken, and two pass-through links to at least one new module connector are formed.

The backplanes connect with modules through the module connectors. Each module can be a fabric routing node such that a network router is formed. Alternatively, each module can be a data processing module such that a multicomputer system is formed.

The backplanes and configuration controllers form a backplane structure that provides links which electrically can connect the plurality of module connectors in a logical torus having multiple dimensions. Each link preferably includes a pair of unidirectional channels. Each channel preferably carries differential signals. The preferred configuration controllers are circuit boards that operate as switches which are remotely controlled to electrically connect the plurality of module connectors in the logical torus. In one embodiment, the logical torus is three dimensional.

The preferred backplane structure electrically connects the module connectors in an interleaved manner. In particular, the module connectors are disposed physically in row segments on the backplane structure. The row segments are disposed physically on the backplane structure in a two dimensional array. The backplane structure electrically connects the row segments in an interleaved manner in each of the two dimensions of the array. The backplane structure may further connect the module connectors in each row segment in an interleaved manner in a third dimension such that the backplane structure electrically connects the module connectors in an interleaved manner in three dimensions.

The module connection assembly provides links that connect the modules of a multi-module system together. An operator can change the topology of the system remotely by switching one or more of the configuration controllers of the system. In particular, the operator can incrementally expand the system by remotely switching just one of the configuration controllers.

The module connection assembly alleviates the need for using wire cables. Accordingly, the operator does not need to search for the correct cables in a maze of cables, plug and unplug cables, and work with cables in tight places. Additionally, the present invention allows for higher connection density, i.e., connections per inch or board perimeter than that of a typical conventional cabled system.

Furthermore, the module connection assembly is remotely switchable so that the operator is not hindered by space limitations. Accordingly, the topology can be reconfigured without needing to gain access to the back of the system. Also, with remote actuation, it is easy to make sure that the correct paths are being modified when changing the topology of the system. That is, the remote activation reduces the likelihood of connection errors (e.g., plugging a cable into an incorrect location, or incorrectly plugging a cable into a correct location). Additionally, the cost per signal is substantially lower than with a cable. Furthermore, signal integrity is preserved, i.e., the signal remains in a good 100-ohm differential transmission line environment through the connector. In contrast, a cable, and its two connectors, usually involve a significantly greater impedance discontinuity.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 17A–D are system views of module connection assemblies including various assembly configurations according to the invention.

DETAILED DESCRIPTION OF THE INVENTION

A description of preferred embodiments of the invention follows.

The present invention connects together modules of a multi-module data processing system such as an internet router formed by a network of fabric routers, or a multicomputer system. Internet switch routers formed by networks of fabric routers are described in application Ser. No. 08/918,556 now U.S. Pat. No. 6,370,145, filed Aug. 22, 1997, the entire teachings of which are incorporated herein by reference. Multicomputer networks are described in detail in Dally, W. J., "Network and Processor Architectures for Message-Driven Computing," *VLSI and PARALLEL COMPUTATION*, Edited by Suaya and Birtwistle, Morgan Kaufmann Publishers, Inc., 1990, pp. 140–218, the entire teachings of which are incorporated herein by reference.

Figure 1:
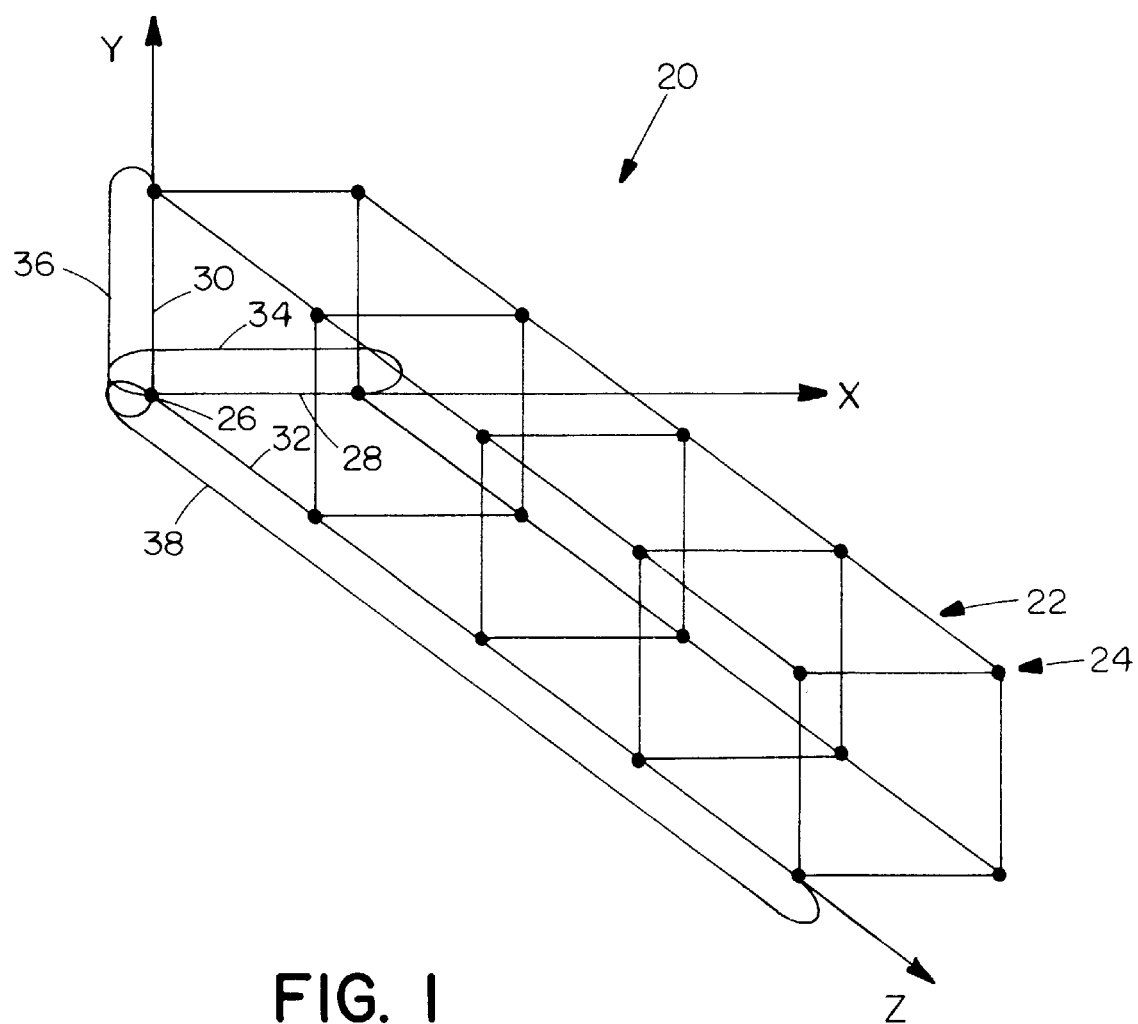
FIG. 1 is a logical view of modules linked together in a 2×2×5 torus arrangement according to the invention.

A logical view of a multi-module data processing system 20 (e.g., an internet router or a multicomputer system) is shown in FIG. 1. The system 20 includes links 22 and modules 24. The links 22 connect the modules 24 in a three-dimensional torus arrangement. In particular, the multi-module system 20 is a 2×2×5 arrangement. That is, the system 20 is two modules wide in the X-direction, two modules high in the Y-direction, and five modules long in the Z-direction.

Each module 24 of the system 20 has six links which extend in six logical directions to other modules. For example, the module 26 located at the origin (the intersection of the X, Y and Z axes) has a link 28 that extends in the positive X-direction, a link 30 that extends in the positive Y-direction, a link 32 that extends in the positive Z-direction, a link 34 that extends in the negative X-direction, a link 36 that extends in the negative Y-direction, and a link 38 that extends in the negative Z-direction.

The links 34, 36 and 38 are end-around connection links that link chains of modules 24 in a loop configuration. That is, the link 34 links two modules extending in the X-direction in a loop, the link 36 links two modules extending in the Y-direction in a loop, and the link 38 links five modules extending in the Z-direction in a loop. Without such torus-connection links, the system 20 would have a mesh configuration rather than a torus configuration. Though described as special torus connection links and seen as such in the FIG. 1 illustration, through the use of interleaving described in detail below, such links become indistinguishable from other links. The arrangement is more particularly a degenerate torus arrangement since the arrangement is less than three modules deep in the X and Y directions.

Each of the other modules 24 has six links which extend to other modules, although for simplicity not all of the links 22 are shown in FIG. 1. Nevertheless, it should be understood that the 2×2×5 system 20 includes 20 links in the X-direction, i.e., 10 standard links (10 shown) and 10 torus-connection links (only one shown). Similarly, the system 20 includes 20 links in the Y-direction, i.e., 10 standard links (10 shown) and 10 torus-connection links (only one shown). Furthermore, the system 20 includes 20 links in the Z-direction, 16 standard links (16 shown) and 4 torus-connection links (only one shown).

The system may be expanded to any size (e.g., to contain any number of modules), and may be expanded in any dimension. The preferred system supports a basic 2×2×5 toroid on a single motherboard (or backplane), and can be populated in the X, Y or Z directions on a module by module basis until the single motherboard is fully populated. Then, the system may be expanded incrementally into adjacent motherboards, each supporting up to a 2×2×5 array. Alternatively, adjacent motherboards can be populated with one or more modules before the first motherboard is fully populated.

Although the links are shown as single wires, each link includes two unidirectional channels. Each unidirectional channel carries differential signals. Preferably, each link uses 112 conductors, 56 conductors for each channel. The 56 conductors carry 28 differential signals including a clock signal, a synchronization signal, a select signal, a credit signal, and 24 data bit signals. The credit signal for a given channel travels in a direction opposite to the direction of the other 27 signals.

Figure 2:
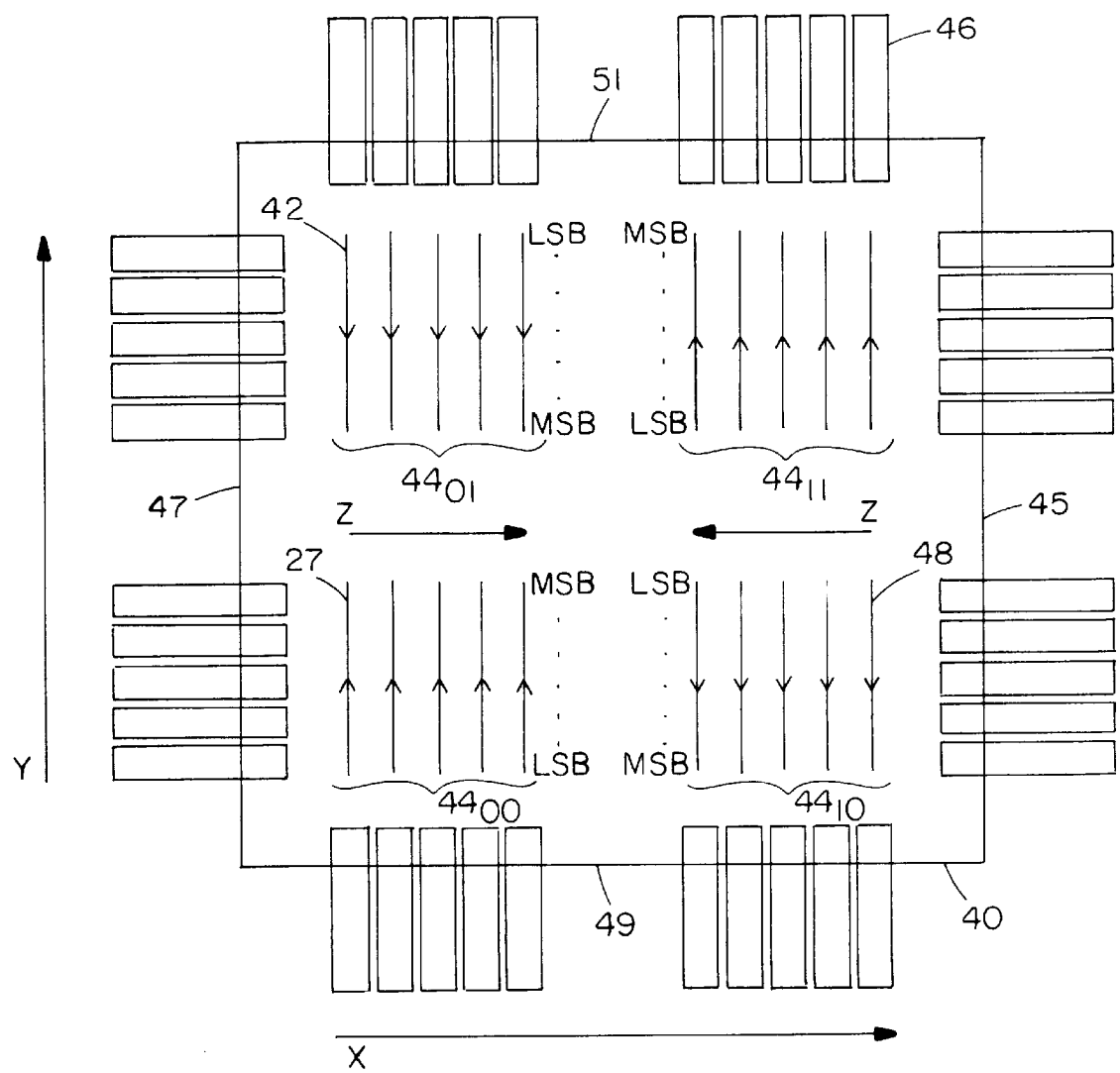
FIG. 2 is a view of a backplane with module connectors, and configuration boards.

A module connection assembly that is suitable for the multi-module system 20 of FIG. 1 is shown in FIG. 2. The assembly includes a backplane 40, module connectors 42, and configuration boards 46. Each module connector 42 electrically connects a module 24 (e.g., a fabric router of an internet switch router, or a processor of a multicomputer system) with the backplane 40. For example, the module connector 27 electrically connects the module 26 (see FIG. 1) with the backplane 40. The backplane 40 has four edges 45, 47, 49 and 51. Ten configuration boards 46 are positioned along each edge to allow for end-around connection of torus connection links as illustrated in FIG. 1 or standard links with X and Y dimensions to adjacent motherboards as will be described below. The backplane 40 and the configuration boards 46 provide conductors that form the links 22 which connect the module connectors 42 in the torus arrangement illustrated in FIG. 1. Preferably, the backplane 40 includes 22 layers of conductors including 9 pairs of signal layers, two signal return layers, and two ground layers. Each pair of signal layers carries differential signals with one signal conductor on each layer of the pair.

The module connectors 42 are arranged in row segments 44. In particular, the module connectors 42 are grouped into four row segments $44_{00}$, $44_{10}$, $44_{01}$ and $44_{11}$, that correspond to the four XY quadrants 00, 10, 01 and 11, of the backplane 40. In particular, segment $44_{00}$ of module connectors 42 electrically connects modules to the backplane 40 to form the row of modules 24 along the Z-axis, as shown in FIG. 1. Segment $44_{10}$ forms the row that is parallel to the Z-axis, displaced in the positive X-direction. Segment $44_{01}$ forms the row that is parallel to the Z-axis, displaced in the positive Y-direction. Segment $44_{11}$ forms the row that is parallel to the Z-axis, displaced in the positive X and Y directions.

The modules 24 that electrically connect with the backplane 40 are circuit boards having electrical contacts (e.g. pins or sockets) along an edge. The module connectors 42 have matching contacts that individually connect with the contacts of the circuit boards. In particular, both the modules 24 and the module connectors 42 have a series of contacts arranged from a least significant bit (LSB) to most a significant bit (MSB). As shown in FIG. 2, the module connectors 42 are oriented such that each connector 42 of row segment $44_{00}$ has its LSB near the periphery of the backplane 40, and its MSB near the interior of the backplane 40. Similarly, each module connector 42 of the row segment $44_{01}$ has its LSB near the periphery of the backplane 40, and its MSB near the interior of the backplane 40. In contrast, each module connector 42 of row segments $44_{10}$ and $44_{11}$ has its MSB near the periphery of the backplane 40, and its LSB near the interior of the backplane 40.

Figure 3:
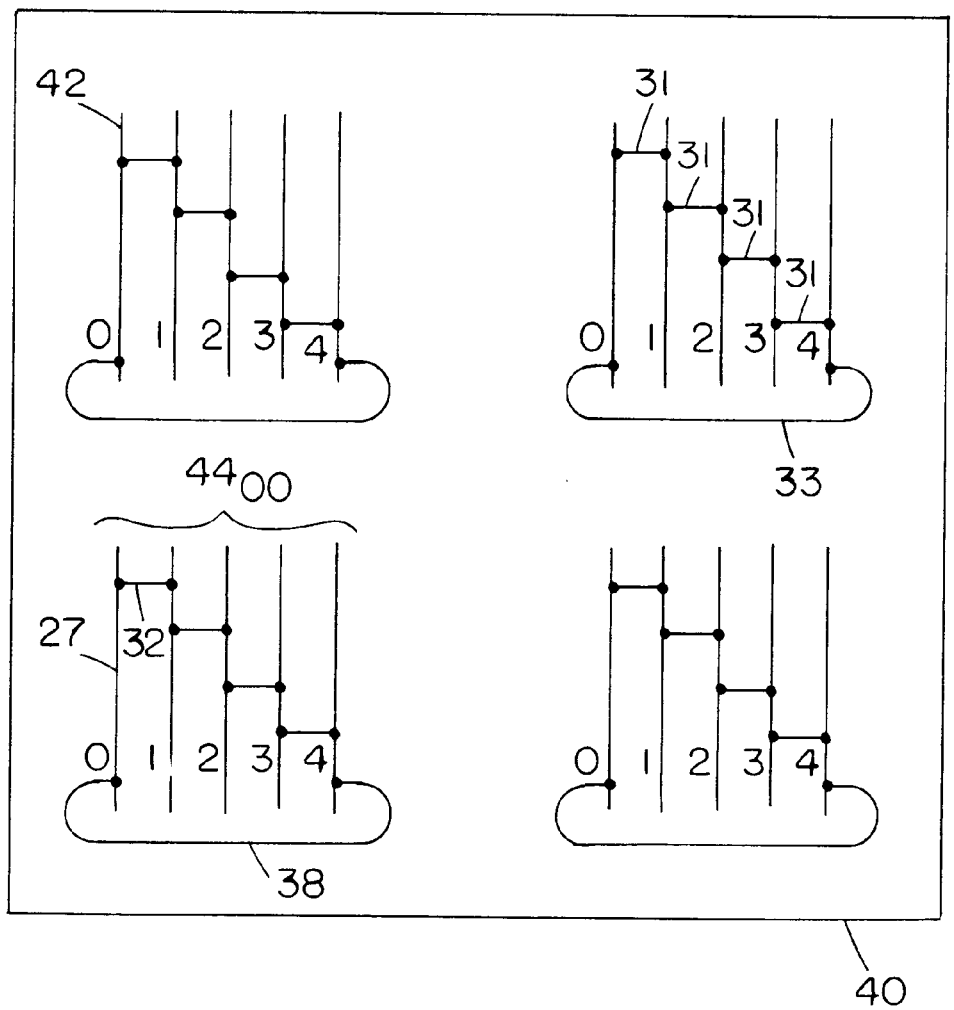
FIG. 3 is a view of the backplane of FIG. 2 with links in the Z-direction.

The module connectors 42 preferably are connected by links 22 in the Z-direction in the manner logically shown in FIG. 3. As shown, the module connectors 42 of each segment are connected in a loop. Accordingly, each module connector 42 has two links 22 leading to other module connectors 42 in the Z-direction. For example, the module connector 27 has two links 32 and 38 (also see FIG. 1) that lead to other module connectors in segment $44_{00}$.

In FIG. 3 it can be seen that within each segment there are four links 31 to adjacent modules, and a final end-around connection 33 which is at least four times as long. To minimize the critical longest connection, the module connectors 42 can be connected by links in the Z-direction in an interleaved manner as logically shown in FIG. 4. Here, the module connectors 42 of each segment of a backplane 40' are still connected in a loop, but each module connector 42 in a segment is connected through a link to another connector 42 of that segment that is at most two module connector positions away. For example, the module connector 27' is connected through the link 32' to a module connector that is one module position away, and through the link 38' to another module connector that is two positions away. This interleaving arrangement minimizes the longest link to at most two module connector positions in length. In contrast, the longest link in the non-interleaved arrangement of FIG. 3 is four module connector positions in length. Since signal propagation time is reduced by decreasing link length, the interleaving arrangement of FIG. 4 minimizes the longest link to two positions in length, and provides reduced signal propagation time over the non-interleaving arrangement of FIG. 3.

Figure 4:
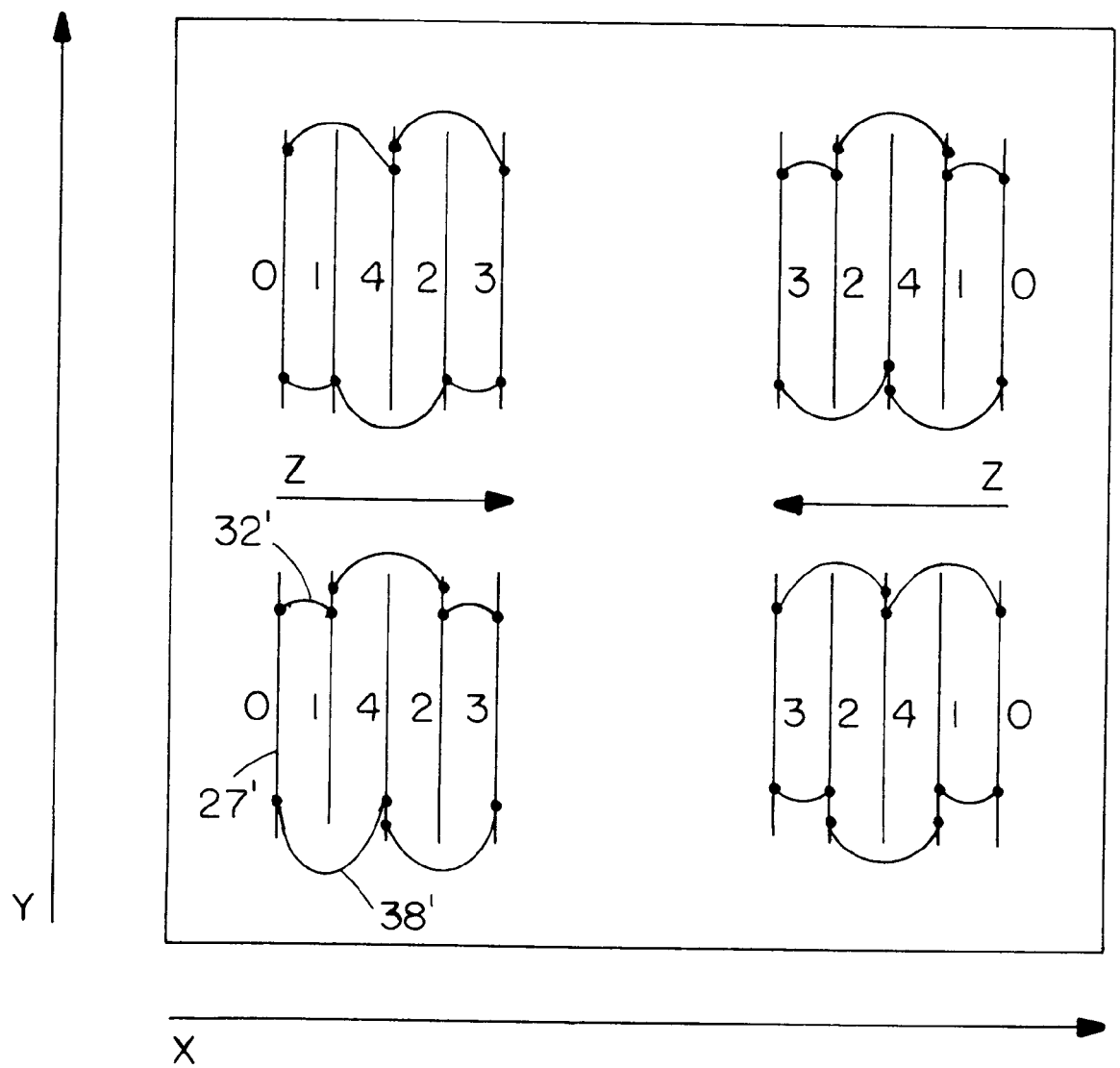
FIG. 4 is a view of the backplane of FIG. 2 with interleaved links in the Z-direction.
Figure 5A:
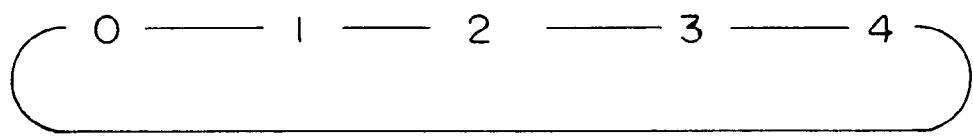
FIGS. 5A–C are views of physical positions for module connectors of row segments of the backplane of FIG. 2.
Figure 5B:
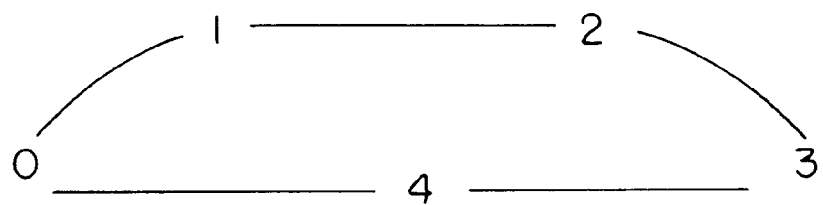
Figure 5C:
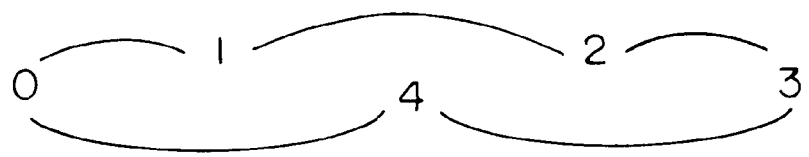

A method for interleaving the row segments 44 shown in FIG. 3 is illustrated in FIGS. 5A–5C. FIG. 5A shows the connection order and physical positioning for the module connectors 24 of one of the row segments 44 in FIG. 3. In FIG. 5B, the connection order for the module connectors 24 is preserved, but the positioning of the module connectors 24 is rearranged. In FIG. 5C, the connection order for the module connectors 24 is still preserved, but the positioning of the module connectors 24 is arranged again as a row segment but with the longest connection being at most two module connector positions away. The module connector positions for each row segment 44 are shown in FIG. 4.

Figure 6:
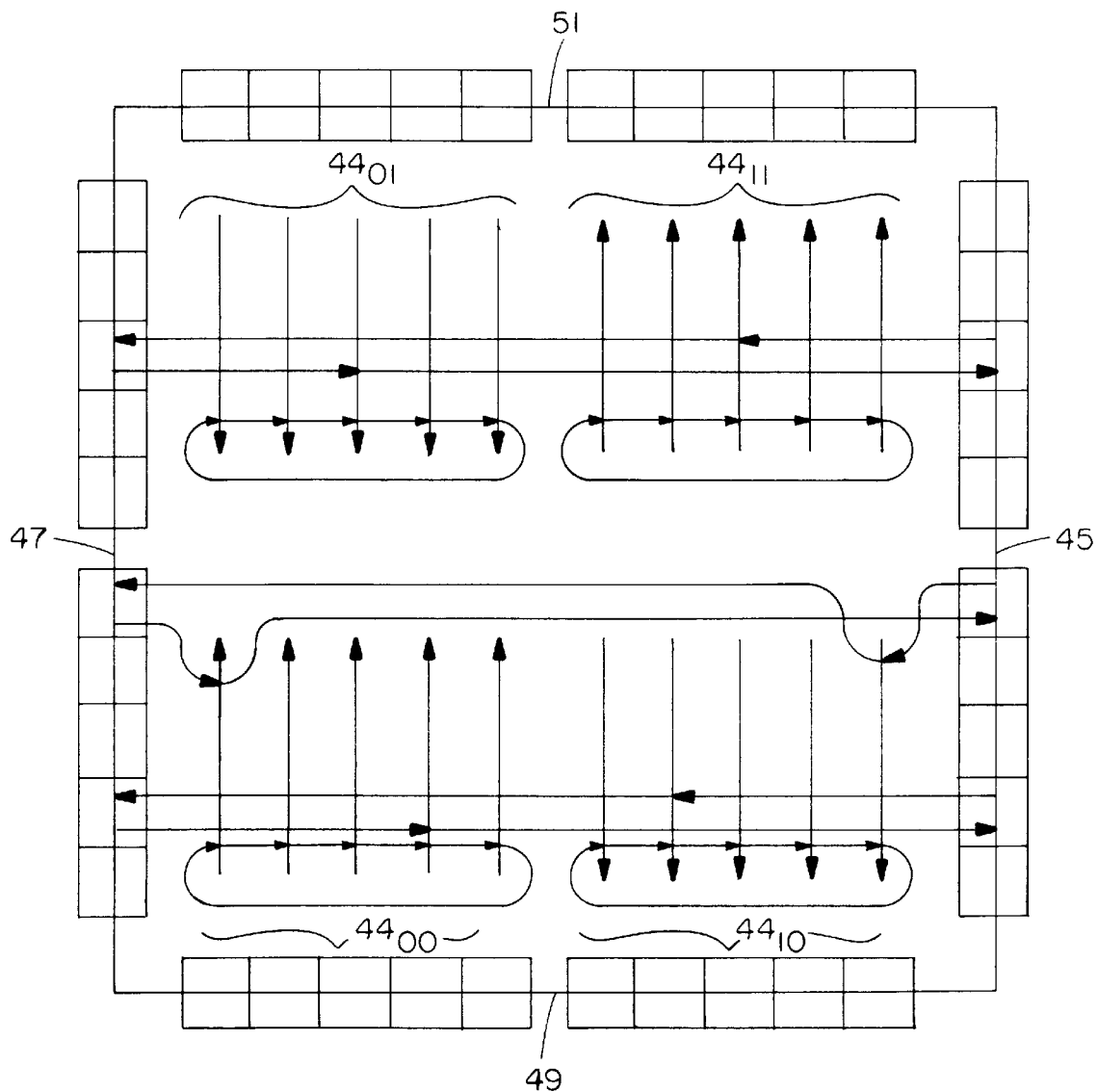
FIG. 6 is a view of the backplane of FIG. 2 with links in the X and Z directions.
Figure 7:
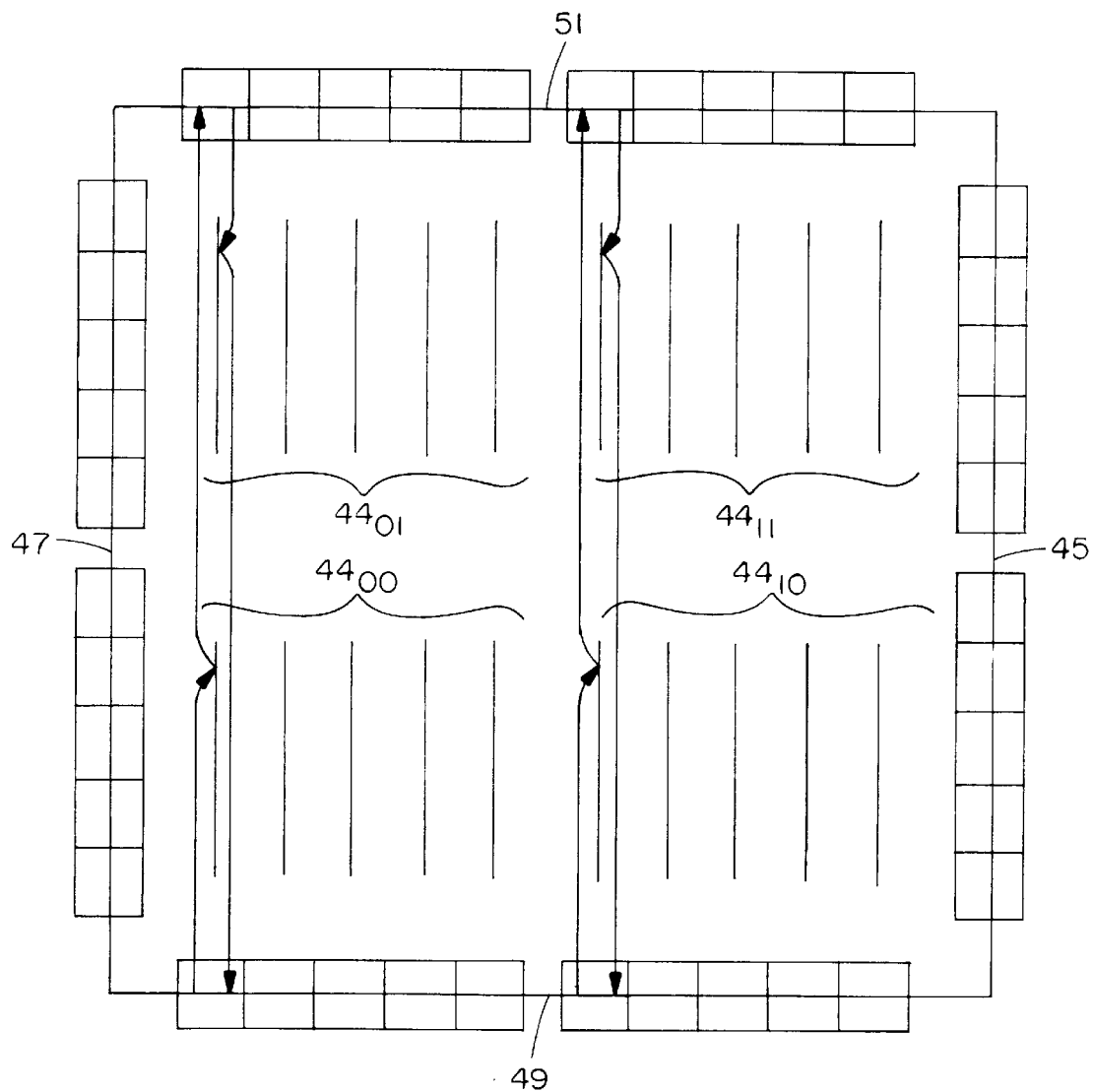
FIG. 7 is a view of the backplane of FIG. 2 with links in the Y-direction.

The module connectors 42 are connected to configuration boards at the edge of the backplane in the X and Y directions as illustrated in FIGS. 6 and 7. As shown in FIG. 6, the modules in each of the four segments 44 are connected in different directions. Segments $44_{00}$ and $44_{01}$ have the +X channels connected to the right edge 45 and their −X channels connected to the left edge 47. Segments $44_{10}$ and $44_{11}$ are connected in the opposite X direction with their +X channels connected to the left edge 47 and their −X channels connected to the right edge 45. Similarly, as shown in FIG. 7, segments $44_{00}$ and $44_{10}$ are connected in one direction in the Y dimension, with their +Y channels connected to the top edge 51 and their −Y channels connected to the bottom edge 49. Segments $44_{01}$ and $44_{11}$ are connected in the opposite Y direction. As will be shown below, this wiring of the backplane facilitates interleaving of backplanes when forming loops in the X and Y directions in large machines since each backplane contributes modules to both the forward and reverse part of the loops in each dimension.

To allow for expansion, the backplane 40 and configuration boards 46 provide the links 22 between the module connectors 42 (see FIG. 2). In particular, each of the 20 X-direction links of the system 20 passes through a corresponding configuration board 46 positioned along the edge 45, or the edge 47 which is opposite the edge 45. Similarly, each of the 20 Y-direction links passes through a corresponding configuration board 46 positioned along the edge 49 or the edge 51 which is opposite the edge 49.

Figure 8:
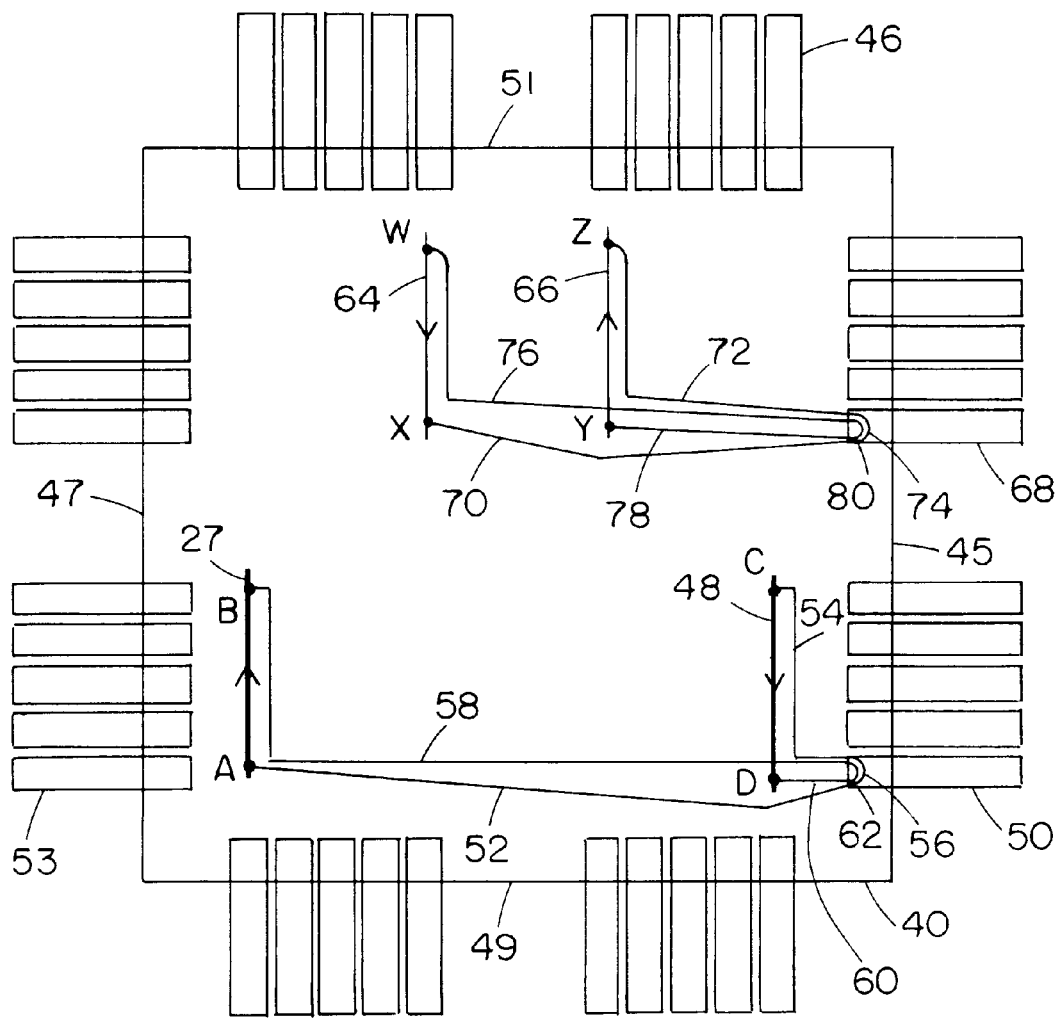
FIG. 8 is a view of the backplane of FIG. 2 showing particular etches connecting module connectors in the X-direction.

More particularly, each link 22 is formed by multiple conducting paths (e.g., 112 conductors) between the module connectors 42, each conducting path carrying a bit of information (an electrical signal) from one module connector to another. The conducting paths for each link 22 in the X-direction are formed by conductors in the backplane 40 and in one of the configuration boards 46 positioned along the edge 45 or the edge 47. For example, as shown in FIG. 8, the conducting paths that form the link 34 (see FIG. 1) extend from the module connector 27 to the module connector 48, through a configuration board 50 along the edge 45. As shown, a first conducting path connects a bit A of the module connector 27 and a bit C of the module connector 48. This path includes conductors 52 and 54 of the backplane 40, and a conductor 56 of the configuration board 50. Similarly, a second conducting path connects a bit B of the module connector 27 and a bit D of the module connector 48. This second path includes conductors 58 and 60 of the backplane 40, and a conductor 62 of the configuration board 50. It should be understood that not all of the conducting paths for each link are shown in FIG. 8 for simplicity, and that each link includes several conducting paths (e.g., 112 conducting paths).

Module connectors in segment $44_{00}$ and $44_{10}$ are oriented with their LSBs in opposite directions to bound the total wire length of channels in the X direction. With this arrangement, the maximum length of an X channel is the width of the backplane plus the height of one module irrespective of the position of the configuration board that is used to complete the connection. This length is required by both the LSB and MSB of a channel. The intermediate bits may have shorter lengths depending on the position of the configuration board. If the module connectors were arranged in the same direction in these adjacent segments a channel wire could be as long as the width of the backplane plus twice the height of the module connector if the configuration board is at one end of the module connector.

Other configuration boards 46 provide other X-direction links 22. There is one configuration board along the right edge 45 of the backplane and one board along the left edge 47 of the backplane for each pair of module connectors in the backplane. Each configuration board is associated with one connector in segments $44_{00}$ or $44_{01}$ and one connector in segments $44_{10}$ or $44_{11}$. Each configuration board connects module connectors that differ only in their X coordinate. They share the same Y and Z coordinates. For example, as further shown in FIG. 8, conducting paths form a link that extends from a module connector 64 to the module connector 66, through a configuration board 68 along the edge 45. In particular, a first conducting path connects a bit W of the module connector 64 and a bit Y of the module connector 66. This path includes conductors 76 and 78 of the backplane 40, and a conductor 80 of the configuration board 68. Similarly, a second conducting path connects a bit X of the module connector 64 and a bit Z of the module connector 66. This second path includes conductors 70 and 72 of the backplane 40, and a conductor 74 of the configuration board 68.

It should be understood that bits A, C, W and Y correspond to LSBs of their respective module connectors 42, as shown in FIG. 2. Similarly, bits B, D, X and Z correspond to MSBs of their respective module connectors 42.

The configuration boards along the edge 47 form similar X-direction links between the module connectors 42. For example, configuration board 53 provides link 28 that further connects the module connectors 27 and 48. Accordingly, each of the 20 X-direction links 22 is formed by the conductors of the backplane 40 and the conductors of one of the 20 configuration boards 46 positioned along the edges 45 and 47.

As shown in FIGS. 6 and 8, the outermost module connectors 42 (the module connectors closest to the edges 45 and 47) are linked together. Similarly, the next outermost module connectors 42 are linked together, and so on. This layout is preferable to a layout linking the leftmost module connectors together (e.g., linking the module connectors of segments $44_{00}$ and $44_{10}$ that are closest to the edge 47), the next leftmost module connectors together, and so on, as will now be discussed.

Figure 9A:
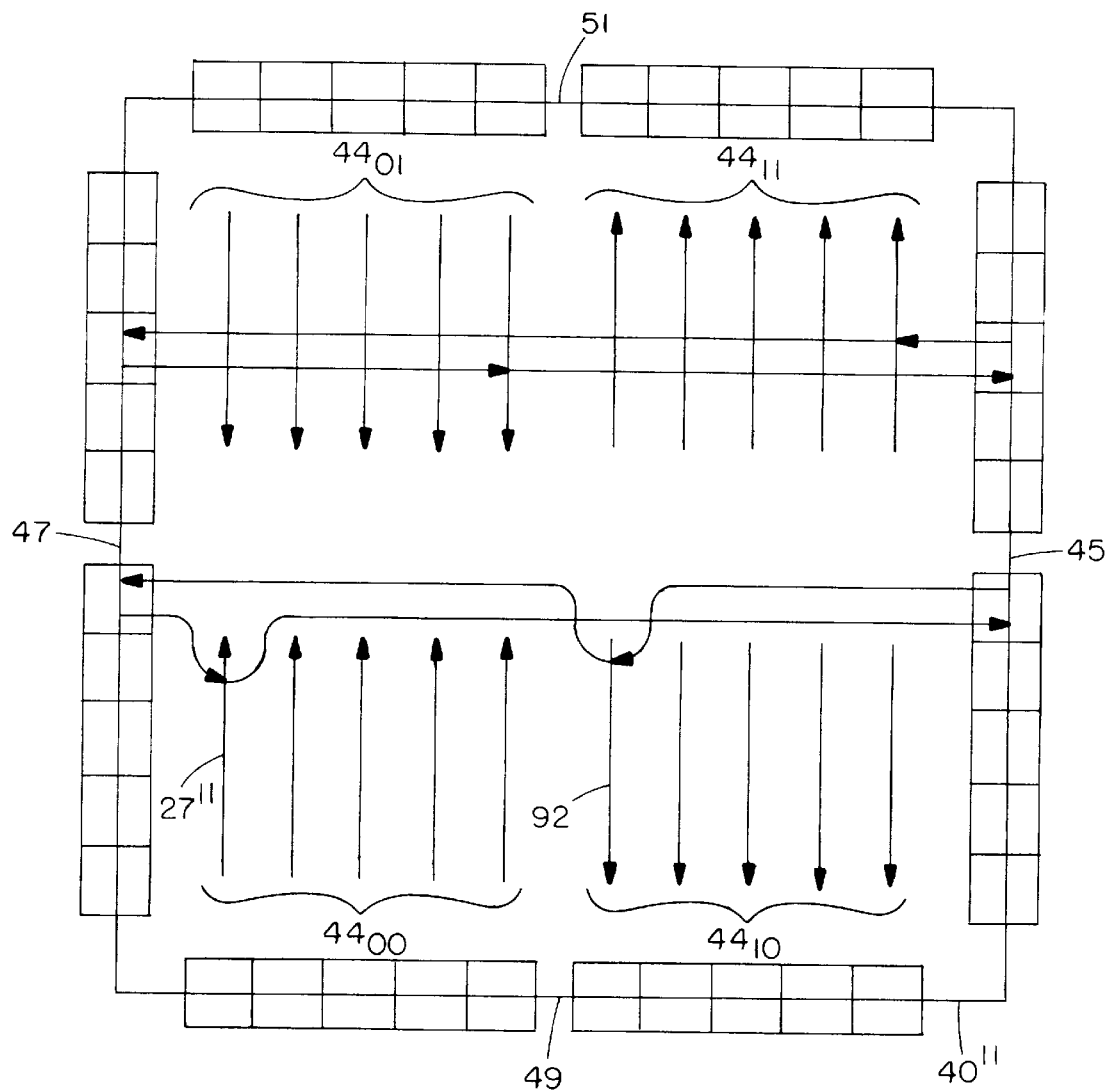
FIG. 9A is a view of the backplane of FIG. 2 with alternative links in the X-direction.
Figure 9B:
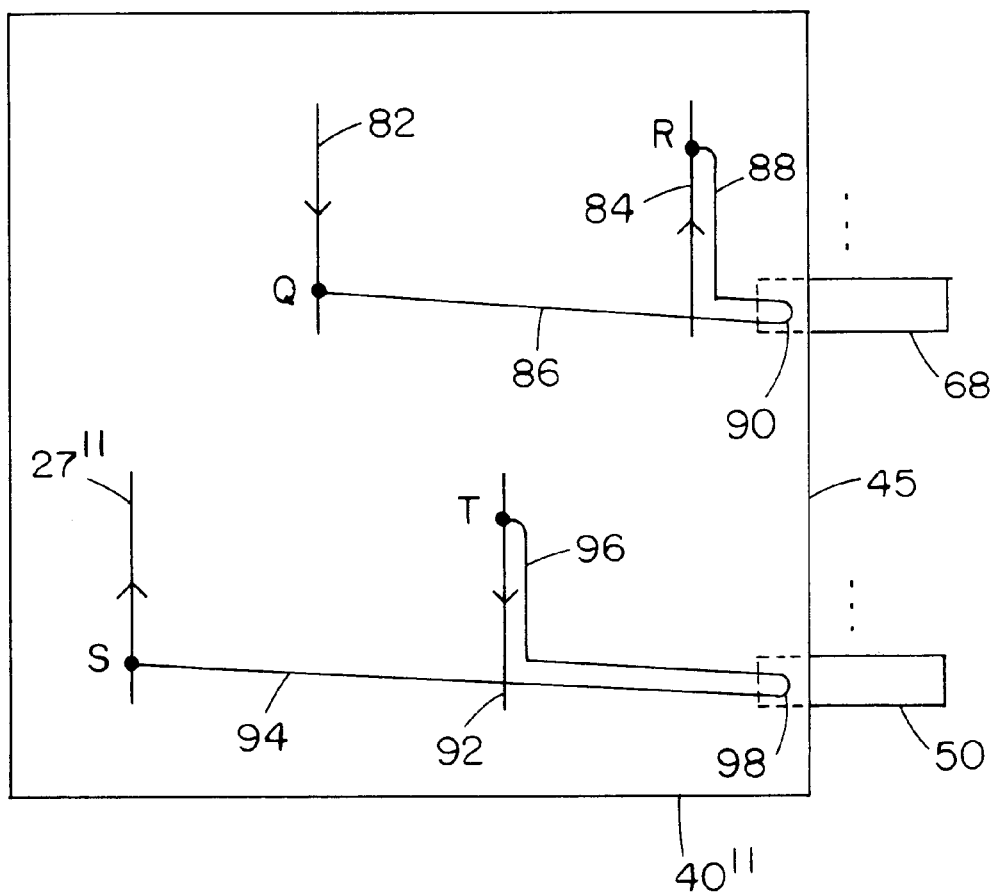
FIG. 9B is a view of the backplane of FIG. 9A showing particular etches connecting module connectors in the X-direction.

To illustrate the length of the chosen layout of modules in FIGS. 6 and 8 consider an alternative conducting path arrangement which might have been chosen for the backplane 40. Recall that the conducting paths of FIG. 8 correspond to the X-direction links 22 shown logically in FIG. 6. If the X-direction links 22 are arranged differently, the conducting paths arrangements will differ as well. For example, an alternative X-direction link arrangement shown in FIG. 9A would be logically suitable for the backplane 40. FIG. 9B shows conducting path arrangements for the FIG. 9A X-direction link arrangement. A conducting path between module connectors 27" and 92 includes conductors 94 and 96 of the backplane 40, and a conductor 98 of the configuration board 50. Similarly, a conducting path between module connectors 82 and 84 includes conductors 86 and 88 of the backplane 40, and a conductor 90 of the configuration board 68.

However, from a comparison of the lengths of the conducting paths of FIGS. 8 and 9B, it should be understood the conducting paths in FIG. 8 provide better minimization of the longest conducting path. In particular, for FIG. 8, the conducting paths between the outer module connectors 27 and 48 include a long conductor (e.g., 52 or 58) and a short conductor (e.g., 54 or 62). At the other extreme, the conducting paths between the inner module connectors 64 and 66 include two intermediate length conductors (e.g., 70,72 or 76,78). The FIG. 8 conducting paths formed by long and short conductors approximately equal the FIG. 8 conducting paths formed by two intermediate length conductors. In contrast to the FIG. 8 conducting paths, in FIG. 9B, all links include an intermediate length conductor along with a conductor ranging from short to long, resulting in a range of overall lengths and a critical maximum length which is longer than in FIG. 8. For example, the conducting path that connects module connectors 27" and 92 includes a long conductor 94 and an intermediate conductor 96. This conducting path is substantially longer than those formed by an long and short conductor, or two intermediate conductors, as shown in FIG. 8. Accordingly, the FIG. 8 conducting path arrangement and the FIG. 6 link arrangement provides better minimization of the longest conducting paths than those of FIGS. 9B and 9A.

Figure 10:
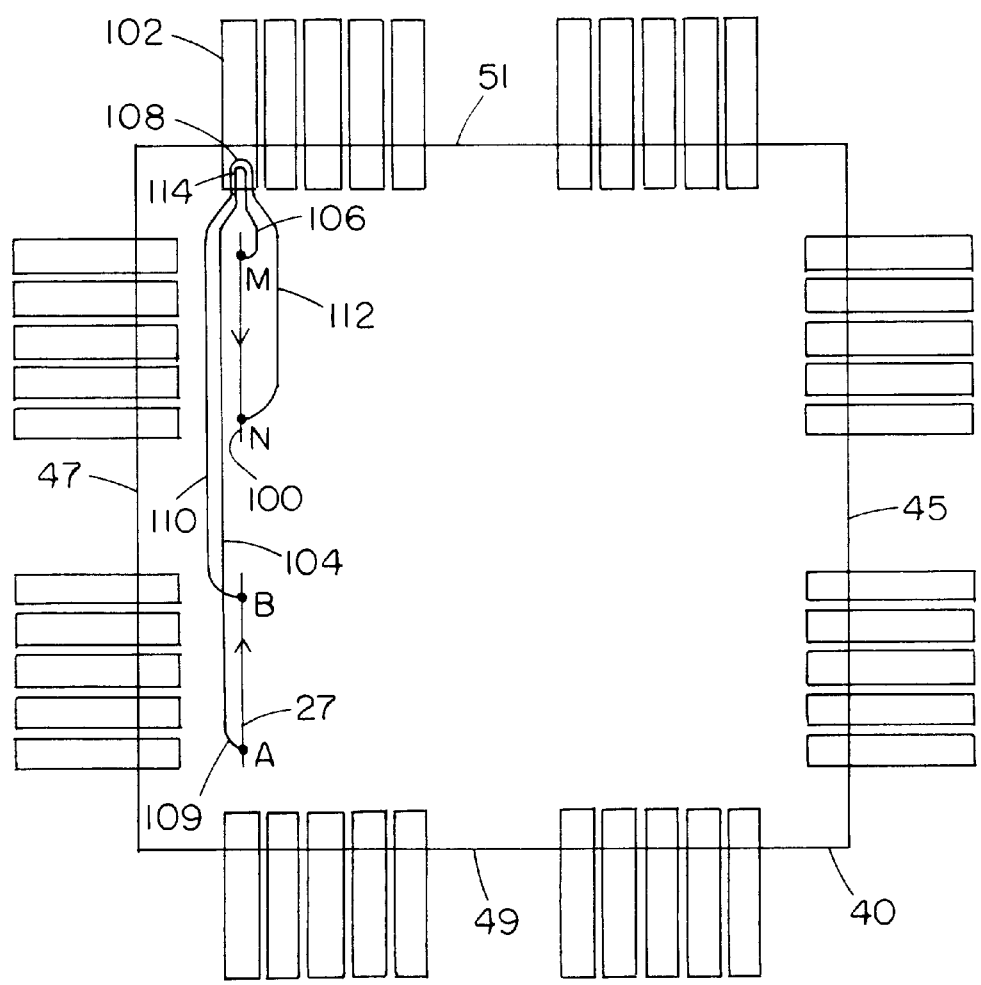
FIG. 10 is a view of the backplane of FIG. 2 showing particular etches connecting module connectors in the Y-direction.

Each Y-direction link 22 is also formed by multiple conducting paths provided by the backplane 40 and one of the configuration boards 46 positioned along the edges 49 and 51. For example, as shown in FIG. 10, the conducting paths that form the link 30 (see FIG. 1) extend from the module connector 27 to the module connector 100, through a configuration board 102 positioned along the edge 51. In particular, a first conducting path connects the bit A of the module connector 27 and a bit M of the module connector 100. This path includes conductors 109 and 106 of the backplane 40, and a conductor 114 of the configuration board 102. Similarly, a second conducting path connects the bit B of the module connector 27 and a bit N of the module connector 100. This second path includes conductors 110 and 112 of the backplane 40, and a conductor 108 of the configuration board 102. Note that since the order of least significant bit to most significant bit is reversed between the lower and upper quadrants, the conductor lengths range from long-plus-short to intermediate-plus-intermediate lengths, thus maintaining approximately equal combined lengths in the Y direction as well.

Other configuration boards 46 positioned along the edges 49 and 51 provide the other Y-direction links 22 of the system 20. That is, each of the 20 Y-direction links 22 is formed by the conductors of the backplane 40 and the conductors of one of the 20 configuration boards 46 positioned along the edge 49 or the edge 51.

By providing individual configuration boards along each edge, the system 20 is incrementally expandable. That is, the topology of the system has the capability of expanding in a scalable manner, one module (or module connector) at a time. To this end, each configuration board 46 acts as a remotely configurable switch, or a configuration controller, that selectively provides end-around electrical paths and pass-through electrical paths. The configuration board conductors described thus far (e.g., the configuration board conductors 56 and 62 in FIG. 8) provide end-around electrical paths. Each configuration board 46 further includes conductors that provide pass-through electrical paths, as will now be described in connection with FIGS. 11-16.

Figure 11:
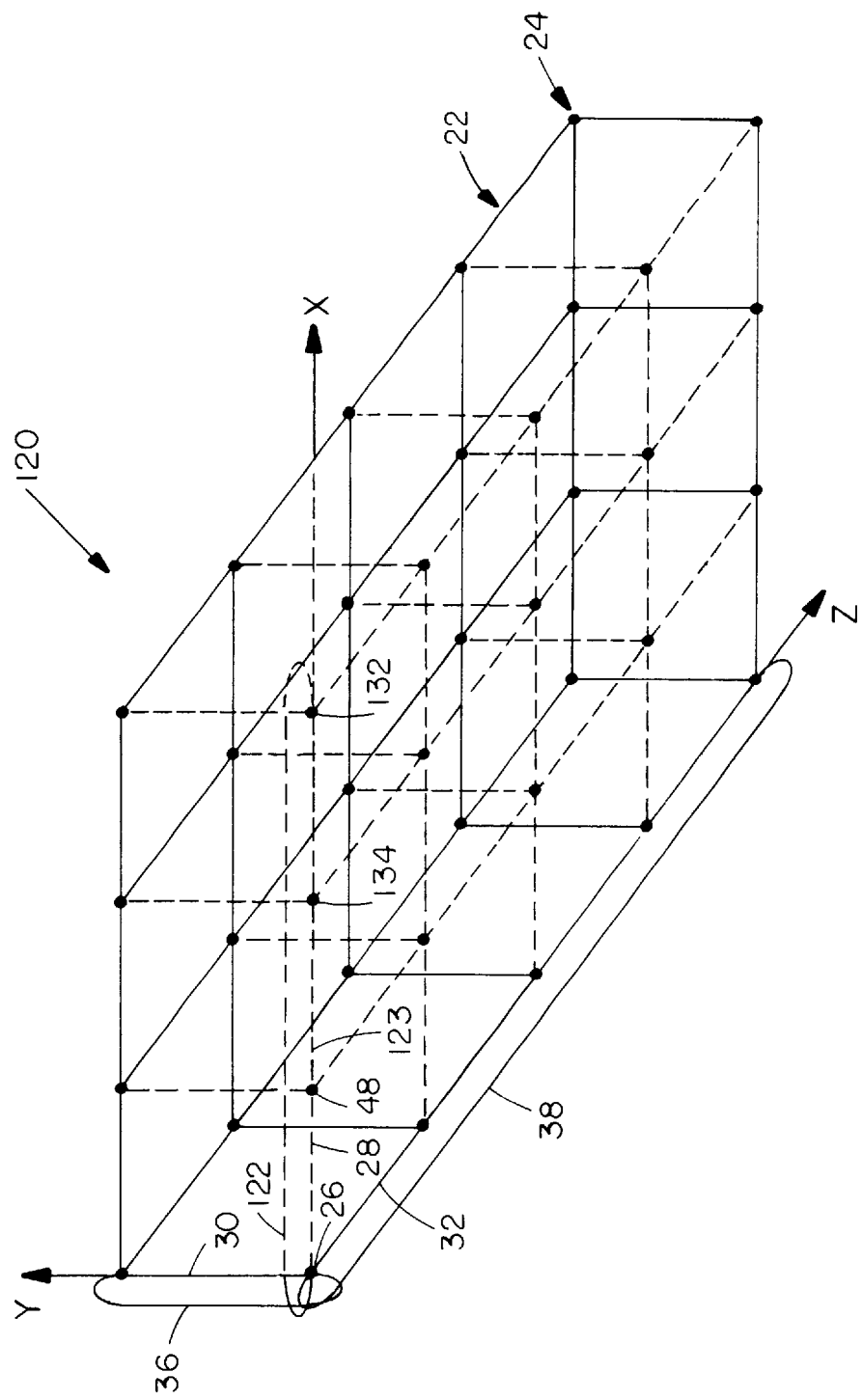
FIG. 11 is a logical view of modules linked together to form a 4×2×5 torus arrangement according to the invention.

The system 20 is adaptable so that additional backplanes can be added to the system. When another backplane is added, and when each of the configuration boards along an edge of the backplane 40 provides pass-through electrical paths rather than end-around electrical paths, the size of the system 20 doubles forming a larger system 120. That is, the number of modules (or module connectors) in the system 120 is twice that of the system 20. A logical view of such a multi-module data processing system 120 is shown in FIG. 11. The system 120 includes links 22 and modules 24 that form a three-dimensional torus arrangement. In particular, the multi-module system is a 4×2×5 arrangement. That is, the system 120 is four modules wide in the X-direction, two modules high in the Y-direction, and five modules long in the Z-direction.

As in the system 20, each module 24 of the system 120 has six links which extend in six logical directions to other modules. For example, the module 26 located at the origin (the intersection of the X, Y and Z axes) has a link 28 that extends in the positive X-direction, a link 30 that extends in the positive Y-direction, a link 32 that extends in the positive Z-direction, a torus-connection link 122 that extends in the negative X-direction, a torus-connection link 36 that extends in the negative Y-direction, and a torus-connection link 38 that extends in the negative Z-direction. Similarly, the other modules have six links which extend to other modules, although for simplicity not all of the links are shown in FIG. 11.

By comparing FIG. 11 to FIG. 1, it can be seen that the expanded array 120 of FIG. 11 is formed by breaking end-around links in the X-direction (e.g., link 34 in FIG. 1) and by replacing each broken link with a pair of pass-through links (e.g., a standard link 123 and a torus connection link 122).

The movement of configuration boards from the end-around position to the pass-through position is performed one configuration board at a time to facilitate incremental expansion of the system. Switching a single configuration board extends one of the "loops" in the X direction from 2-nodes to 4-nodes while leaving all other X-loops at 2-nodes. For example, switching configuration board 50 in FIG. 12 connects modules connectors 27, 48, 134, 132 in a loop while leaving the rest of the network in the 2×2×5 configuration shown in FIG. 1. By switching one configuration board at a time, the system can be expanded in increments of two modules as compared to prior art systems that required maintaining a regular topology and expanding in increments of one or more whole backplanes.

Addition of a single module can be achieved by switching a single configuration card and then inserting the new module and a dummy module into the two connectors added to an X-loop by this action. The dummy module acts as a repeater to complete the connection around the cycle in the X-direction and can be replaced by a real module when the system is next expanded.

Figure 12:
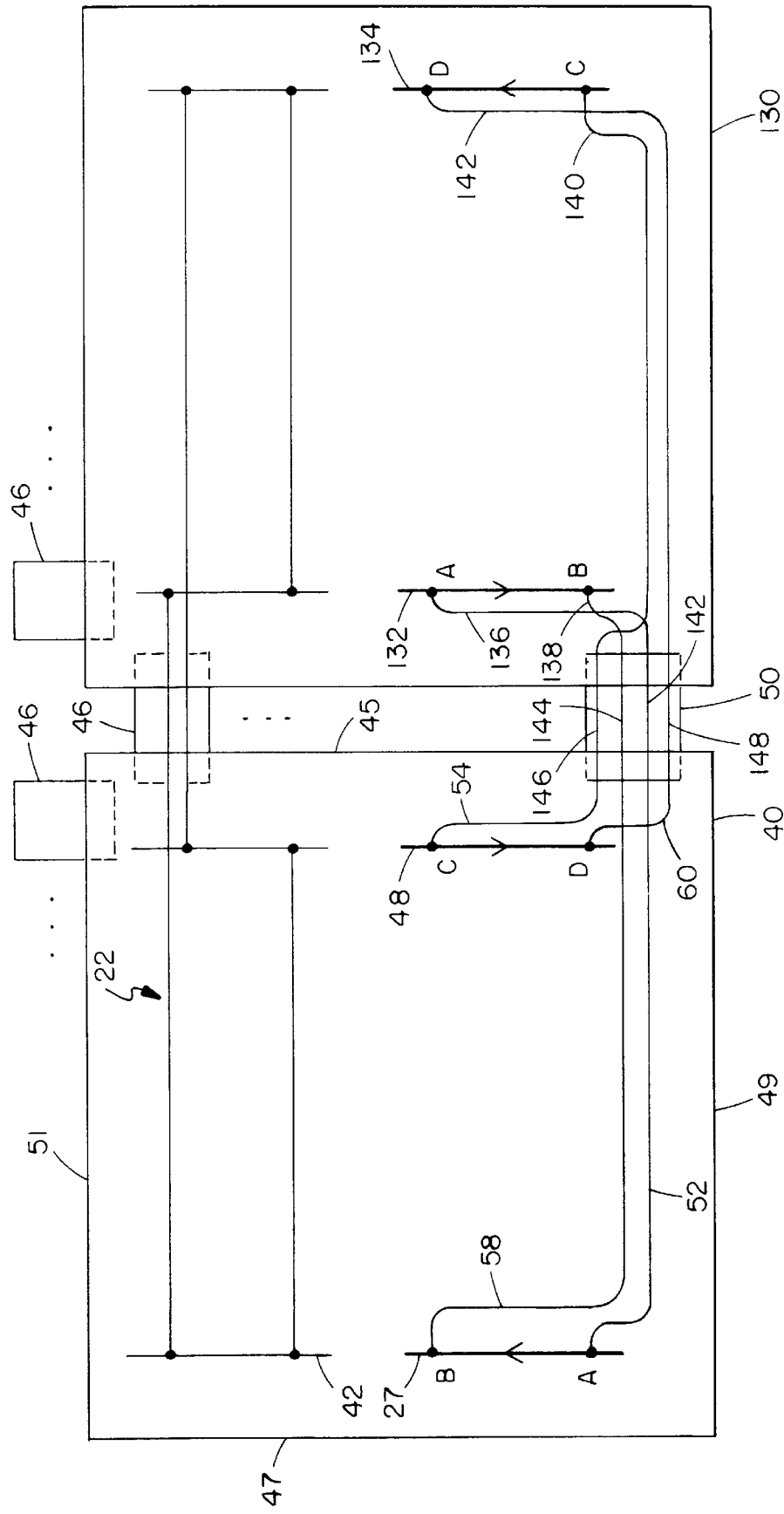
FIG. 12 is a view of two backplanes linked in the X-direction by a configuration board.

A module connection assembly that is suitable for the multi-module system 120 of FIG. 11 is shown in FIG. 12. The assembly includes a first backplane 40, a second backplane 130, module connectors 42, and configuration boards 46. Backplane 130 is identical to backplane 40 except that each of its module connectors are oriented in the opposite direction from backplane 40. Backplane 130 is realized using the same circuit board type as backplane 40 rotated 180 degrees to give this reversal of module connector orientations. This reversal of connector orientation of alternating backplanes keeps the maximum wire length for a channel less than the width of the backplane plus the height of a module irrespective of which configuration card the channel passes through. The configuration boards 46 along the edge 45 provide pass-through electrical paths, rather than end-around electrical paths, such that each configuration board 46 forms two links. The two links complete a loop of four module connectors. For example, the top portion of FIG. 12 logically shows the links between the two outermost module connectors of each backplane in the system 120. The next outermost module connectors are connected in a loop in a similar manner using another configuration board 46, and so on.

It should be understood that the module connectors 42 are linked in the X-direction in an interleaved manner. That is, the module connectors 46 of the leftmost segment of the backplane 40 are linked with the module connectors of the corresponding leftmost segment of the backplane 130, rather than the rightmost segment in of the backplane 130. Similarly, the module connectors 46 of the rightmost segment of the backplane 40 are linked with the module connectors of the corresponding rightmost segment of the backplane 130, rather than the leftmost segment of the backplane 130. Such interleaving avoids long links across the two backplanes, i.e., links between a leftmost segment of the backplane 40 and the rightmost segment of the backplane 130 are avoided. Even as the torus is expanded with many more mother boards in the X-direction, no linked modules are ever displaced by more than the combined width of a single motherboard and configuration board.

Each link 22 is formed by multiple conducting paths between the module connectors 42. The conducting paths for each link 22 that extend across both backplanes 40 and 130 are formed by conductors in the backplane 40 and in one of the configuration boards 46. For example, the conducting paths that form the link 122 (see FIG. 11) extend from the module connector 27 to the module connector 132, through the configuration board 50 along the edge 45, as shown in FIG. 12. In particular, a first conducting path connects a bit A of the module connector 27 and a bit A of the module connector 132. This path includes conductor 52 of the backplane 40, a conductor 142 of the configuration board 50, and a conductor 136 of the backplane 130. Similarly, a second conducting path connects a bit B of the module connector 27 and a bit B of the module connector 132. This second path includes conductor 58 of the backplane 40, a conductor 144 of the configuration board 50, and a conductor 138 of the backplane 130.

The configuration board 50 further provides conductors that form a second link that extends between the backplanes 40 and 130. In particular, the conducting paths that form the link 123 (see FIG. 11) extend from the module connector 48 to the module connector 134, through the configuration board 50 along the edge 45, as shown in FIG. 12. A first conducting path connects a bit C of the module connector 48 and a bit C of the module connector 134. This path includes conductor 54 of the backplane 40, a conductor 146 of the configuration board 50, and a conductor 140 of the backplane 130. Similarly, a second conducting path connects a bit D of the module connector 48 and a bit D of the module connector 134. This second path includes conductor 60 of the backplane 40, a conductor 148 of the configuration board 50, and a conductor 142 of the backplane 130.

Note that, because the direction of least significant bit to most significant bit is reversed between, for example, modules 27 and 132, the conductor lengths remain equal to each other and independent of the position of the configuration board within the lower portion of card edge 45. All conductors pass through the entire horizontal distance between modules. Further, the conductors pass the vertical distance from the configuration board to the corresponding connection to each module. Conductor 58 runs the full vertical distance to module 27 but the shortest vertical distance to module 132. In the other extreme, conductors 52 runs the shortest distance to module 27 and the longest to module 132. Other connections follow intermediate distances which, combined, approximate the length of conductors 52 and 58.

The conductors 142, 144, 146 and 148 of the configuration board 50 provide pass-through electrical paths. Each configuration board 46 is adapted to provide selectively end-around electrical paths that form one link (e.g., the link 34 of FIG. 1), and pass-through electrical paths that form two links (e.g., the links 122 and 123 of FIG. 11.) In particular, each configuration board 46 is a movable circuit board that moves between an end-around position and a pass-through position relative to the backplanes 40 and 130. When the configuration board is in the end-around position, the end-around electrical paths are provided to the backplane 40. When the configuration board is in the pass-through position, the pass-through electrical paths are provided to the backplanes 40 and 130 to electrically connect module connectors 42 of the backplanes together.

Figure 13:
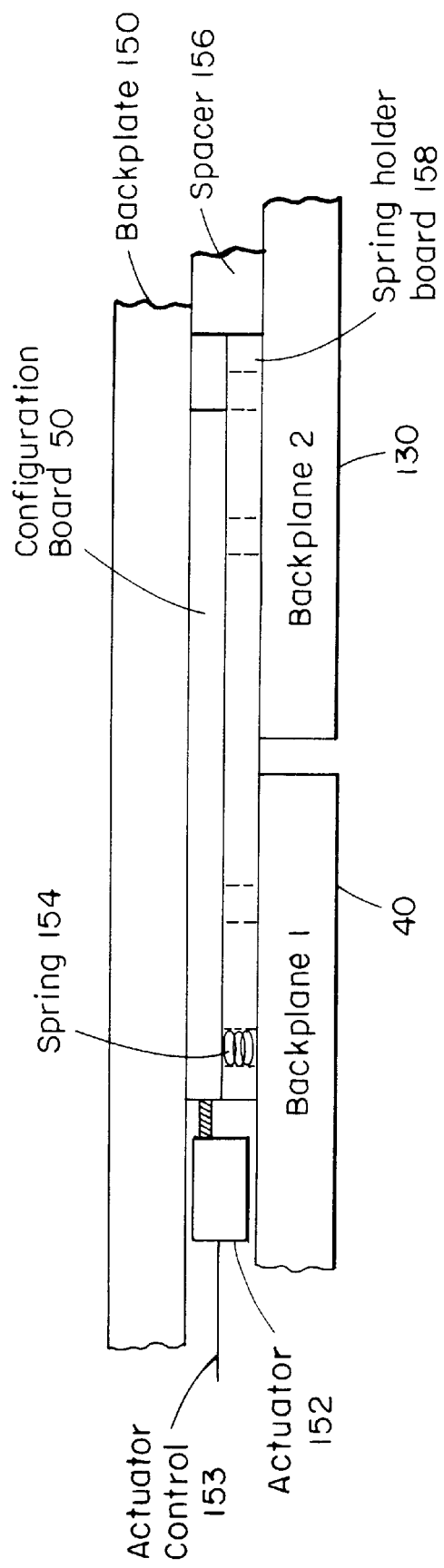
FIG. 13 shows a side view of the two backplanes and the configuration board of FIG. 12.

FIG. 13 is an edge view of a portion of the system 120 showing the backplanes 40 and 130, the configuration board 50, a backplate 150 and an actuator 152. The backplate 150 holds the backplanes 40 and 130, and the actuator 152 in fixed positions. The actuator 152 moves the configuration board 50 between the end-around and pass-through positions in response to an electrical signal received on an actuator control input 153. In the preferred embodiment the actuator is an electric motor that drives a cam that engages in a slot in the configuration board. When the actuator control is asserted the cam rotates through 180 degrees exerting a force on the slot in the configuration board that causes the board to slide from one position to the other. A spacer assembly 156 provides structural support to separate and hold the backplane 130 in place relative to the backplate 150. The spacer assembly 156 extends along the configuration board 50, and includes a spring holder board 158 that holds springs 154 in place. Each spring 154 provides an electrical connection between a pad of the configuration board and a pad of a backplane when the pads are aligned. The spacer assembly 156 further separates the backplanes 40 and 130 and the backplate 150 such that the configuration boards can move between the backplanes 40 and 130 and the backplate 150.

Each spring 154 forms an electrical path between the configuration board and a backplane. In the preferred embodiment, each spring is constructed from a conductive beryllium spring wire wound into a circle at either end as illustrated in FIG. 13. The spring is compressed between the backplane and the configuration board so that it exerts force against the conductive metal pads on each board. When the configuration board is moved, the spring slides along the metal pads making a wiping, gas-tight electrical contact.

Figure 14:
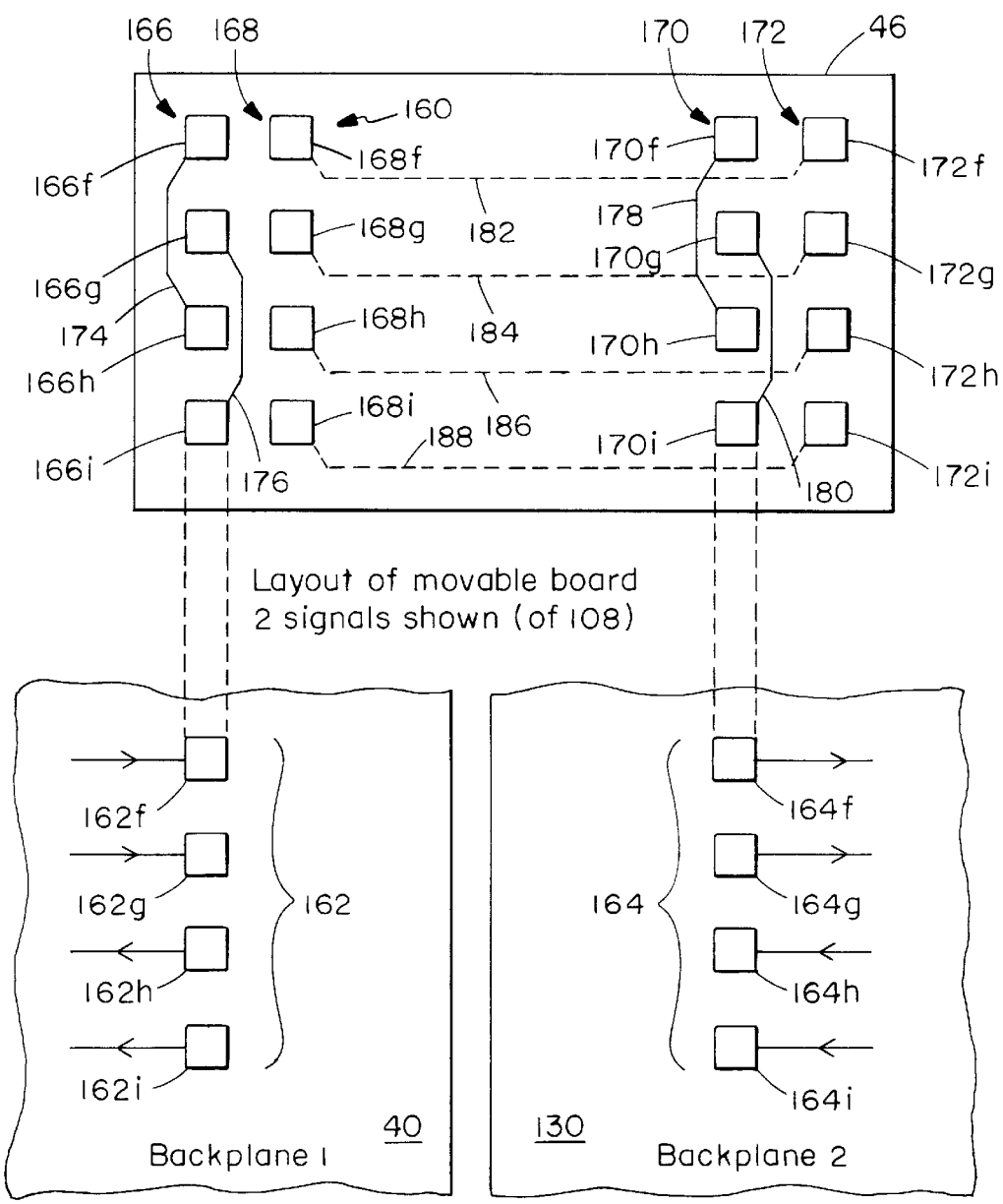
FIG. 14 shows pad layouts for the two backplanes and the configuration board of FIG. 12.

It should be understood that the conductors that form the conducting paths in the configuration boards 46, and the backplanes 40 and 130, are formed of rigid metallic material (e.g., etch) on circuit board layers that are compressed together. The metallic material is accessed through vias and metallic pads on the surface of the configuration boards 46 and the backplanes 40 and 130, as shown in FIG. 14. For example, the backplane 40 includes a set of pads 162, the backplane 130 includes a set of pads 164, and the configuration board 46 includes multiple sets of pads 166, 168, 170 and 172. The pads 162 of the backplane 40 match with a set of pads 166 on a configuration board 46. When the configuration board 46 is positioned relative to the backplane 40 such that the pads 162 match with the pads 166, the springs 154 (see FIG. 13) connect the pads 162 with the pads 166 such that the configuration board 46 provides end-around electrical paths to the backplane 40. As shown in FIG. 14, such an alignment would provide one conducting path from pad 162f of the backplane 40, to pad 166f of the configuration board 46, through an end-around conductor 174 of the configuration board 46, to a pad 166h of the configuration board 46, to a pad 162h of the backplane 40. Similarly, the alignment would provide another conducting path from pad 162g, to pad 166g, through an end-around conductor 176, to a pad 166i, to a pad 162i.

The pads 162f and 162g (and their respective conductors within the backplane) provide differential signals and are thus positioned adjacent to each other. Similarly, pads 162h and 162i (and their conductors) receive differential signals and are adjacent to each other. Furthermore, conductors 182, 184 and conductors 186, 188 respectively carry differential signals between the two backplanes 40 and 130.

The pads 170 and end-around conductors 178, 180 of each configuration board 46 are optional. When available, they provide end-around connections for the second backplane 130.

When the configuration board 46 is moved into the pass-through position by its respective actuator 152, the configuration board 46 provides pass-through electrical paths that forms two links between the backplanes 40 and 130. That is, the pads 168 of the configuration board 46 align with the pads 162 of the backplane 40, and the pads 170 of the configuration board 46 align with the pads 164 of the backplane 130. A first conducting path is formed from the pad 162f, to the pad 168f, through a pass-through conductor 182, to a pad 170f, to a pad 164f on the backplane 130. Similarly, other conducting paths are formed through the configuration board 46 to complete two links between the backplanes 40 and 130.

When the configuration board 46 moves relative to the backplanes, the movement of the configuration board pads (e.g., 166, 168) relative to those of the backplane 40 is more controlled than that of a flexible cable end. In particular, the rigidness of the boards enable the pads of the configuration board 46 to engage the pads of the backplane 40 with better accuracy and precision. Accordingly, the configuration board 46 can be moved (and the system topology can be changed) while the system remains powered up with minimal risk of making an incorrect electrical connection. As such, one or more modules can be added or removed prior to moving the configuration board 46 so that modules can be effectively hotswapped. As mentioned above, cabled systems can be hop-plugged as well.

Other configuration boards 46 between the two backplanes 40 and 130, when in the pass-through positions, provide other X-direction links 22 between the backplanes 40 and 130. Accordingly, the configuration boards 46 along the edge 45 of the backplane 40 extend the topology in the positive X-direction. Another backplane can be added along the edge 47, i.e., the edge opposite the edge 45, to extend the topology of the system 130 in the negative X-direction.

Figure 15:
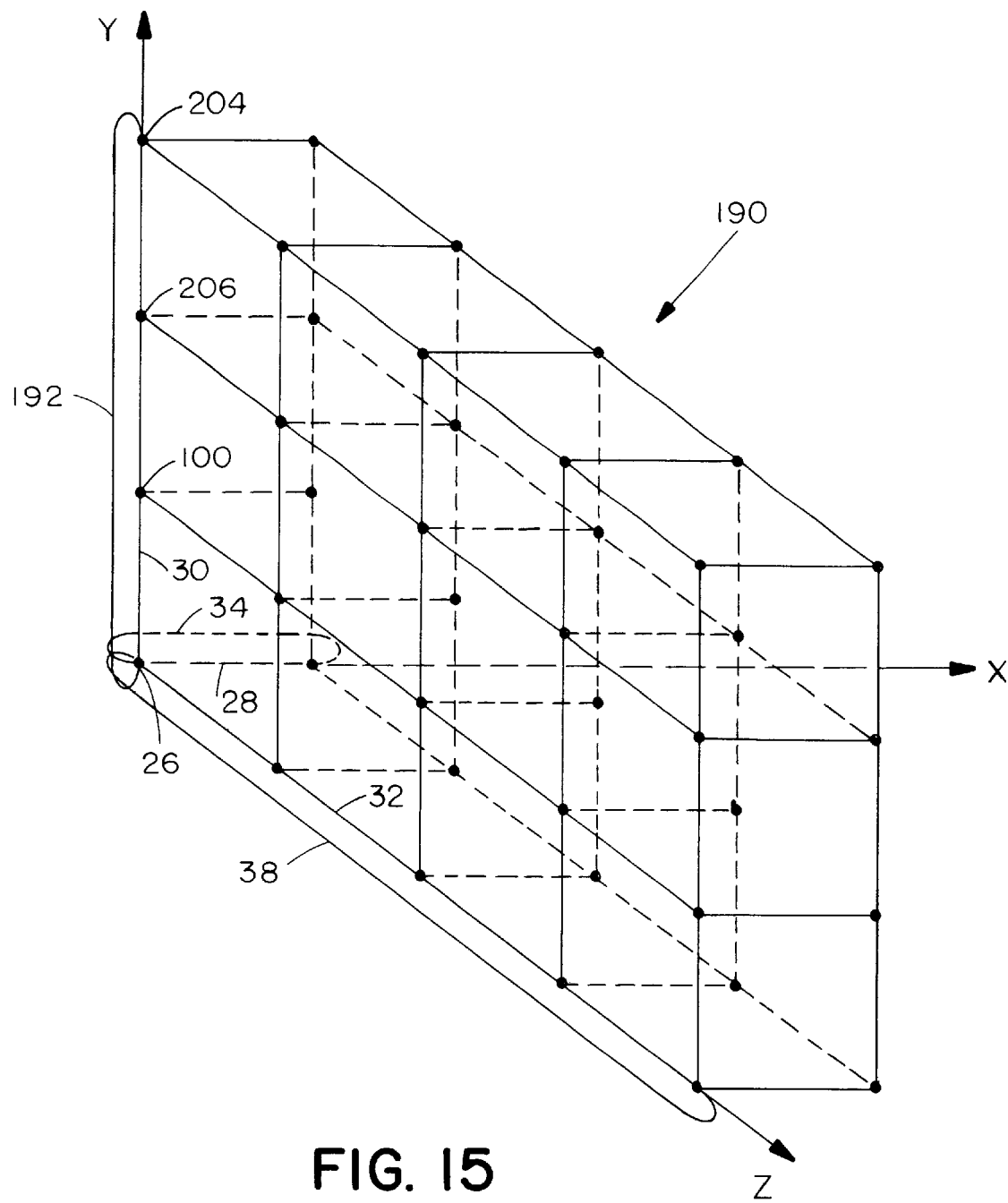
FIG. 15 is a logical view of modules linked together to form a 2×4×5 torus arrangement according to the invention.

Similarly, other configuration boards 46 positioned along the edges 49 and 51 enable the topology to be expanded in the Y-direction. FIG. 15 shows a logical view of a multi-module data processing system 190 formed by expanding the system 20 (see FIG. 1) in the Y-direction. The system 190 includes links 22 and modules 24 that form a three-dimensional torus arrangement. In particular, the multi-module system is a 2×4×5 arrangement.

As in the system 20, each module 24 of the system 190 has six links which extend in six logical directions to other modules. For example, the module 26 located at the origin (the intersection of the X, Y and Z axes) has a link 28 that extends in the positive X-direction, a link 30 that extends in the positive Y-direction, a link 32 that extends in the positive Z-direction, a torus-connection link 34 that extends in the negative X-direction, a torus-connection link 192 that extends in the negative Y-direction, and a torus-connection link 38 that extends in the negative Z-direction. Similarly, the other modules have six links which extend to other modules, although for simplicity not all of the links are shown in FIG. 15.

Figure 16:
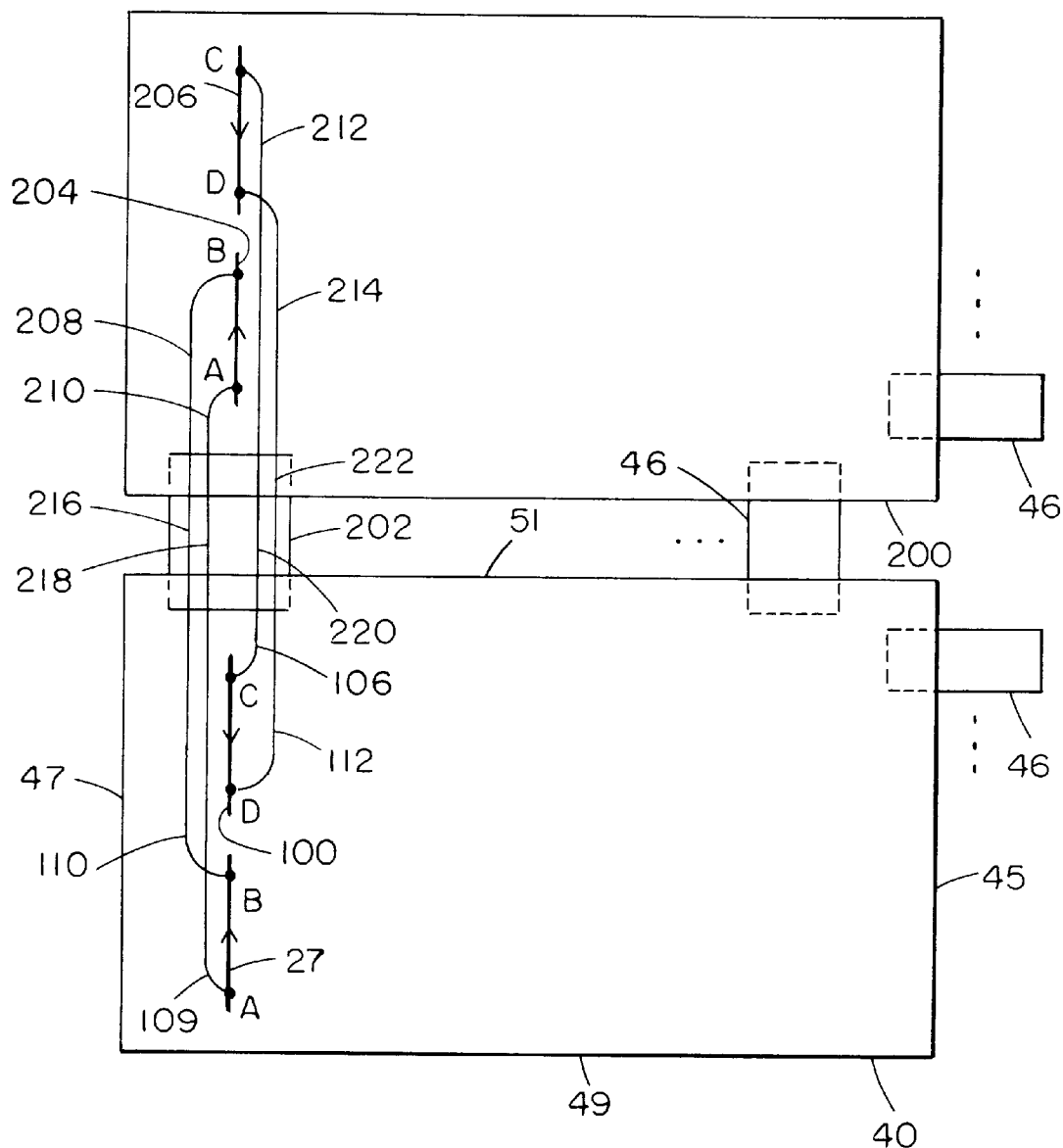
FIG. 16 is a view of two backplanes linked in the Y-direction by a configuration board.

A module connection assembly that is suitable for the multi-module system 190 of FIG. 15 is shown in FIG. 16. The assembly includes a first backplane 40, a second backplane 200, module connectors 42, and configuration boards 46. The backplane 200 is identical to the backplane 40, and has the same orientation as the backplane 40. The configuration boards 46 along the edge 51 provide pass-through electrical paths, rather than end-around electrical paths, such that each configuration board forms two links in a manner similar to that of configuration boards 46 that expand the topology in the X-direction.

It should be understood that the module connectors 42 are linked in the Y-direction in an interleaved manner. That is, the module connectors 46 of the lowest segment of the backplane 40 are linked with the module connectors of the corresponding lowest segment of the backplane 130, rather than the uppermost segment in of the backplane 130. Similarly, the module connectors 46 of the uppermost segment of the backplane 40 are linked with the module connectors of the corresponding uppermost segment of the backplane 130, rather than the lowest segment of the backplane 130. Such interleaving avoids long links across two backplanes, i.e., links between a lowest segment of the backplane 40 and the uppermost segment of the backplane 130 are avoided. Even as many backplanes are added in the Y direction, no bit of any linked module is displaced by more than the height of the backplane plus the configuration board.

Each link 22 is formed by multiple conducting paths between the module connectors 42. The conducting paths for each link 22 that extends across both backplanes 40 and 200 are formed by conductors in the backplane 40 and a single configuration board 46. For example, the conducting paths that form the link 192 (see FIG. 15) extend from the module connector 27 (module 26) to the module connector 204, through the configuration board 202 positioned along the edge 51 of the backplane 40, when the configuration board is in the pass-through position, as shown in FIG. 16. In particular, a first conducting path connects a bit A of the module connector 27 and a bit A of the module connector 204. This path includes conductor 109 of the backplane 40, a conductor 218 of the configuration board 202, and a conductor 210 of the backplane 200. Similarly, a second conducting path connects a bit B of the module connector 27 and a bit B of the module connector 204. This second path includes conductor 110 of the backplane 40, a conductor 216 of the configuration board 202, and a conductor 208 of the backplane 200.

The configuration board 202, when in the pass-through position, provides conductors that form a second link that extends between the backplanes 40 and 130. In particular, the configuration board 202 forms conducting paths that extend from the module connector 100 to the module connector 206, through the configuration board 202 along the edge 51, as shown in FIG. 16. A first conducting path connects a bit C of the module connector 100 and a bit C of the module connector 206. This first path includes conductor 106 of the backplane 40, a conductor 220 of the configuration board 202, and a conductor 212 of the backplane 200. Similarly, a second conducting path connects a bit D of the module connector 100 and a bit D of the module connector 206. The second path includes conductor 112 of the backplane 40, a conductor 222 of the configuration board 202, and a conductor 214 of the backplane 200.

The conductors 216, 218, 220 and 222 of the configuration board 202 provide pass-through electrical paths. Each configuration board 46 is adapted to provide selectively end-around electrical paths that form one link (e.g., the link 36 of FIG. 1), and pass-through electrical paths that form two links (e.g., the link 192 of FIG. 15) in a manner similar to that for the X-direction.

Each of the newly added backplanes (e.g., backplane 130 in FIG. 12, and backplane 200 in FIG. 16) includes configuration boards 46 positioned along its edges. When a configuration board 46 is in the end-around position, it provides end-around electrical paths that form a single link. When the configuration board 46 is in the pass-through position, it forms two links that extend between two backplanes. Additional backplanes can be added to the newly added backplanes, and so on.

It should be understood that the topologies of the systems can be expanded incrementally by moving a single configuration board 46 from its end-around position to its pass-through position, while leaving the other configuration boards in place. As a pair of modules is added to an adjacent motherboard, an end-around link is replaced by two pass-through links. Alternatively, only one complete module and a dummy module (a repeater) need to be added to maintain the full loop. The dummy module would maintain communication in the loop for redundancy without providing the processing power in a multiprocessor array for example. A subsequent expansion will then include replacing the dummy module with a standard processing module 24. As still another alternative, only a single module could be added, thus breaking that loop. The remainder of the network would, however, remain intact. When all of the configuration boards 46 between two backplanes are in their pass-through positions, the two backplanes are fully linked with each other in a complete torus. At this point, any further topology expansion requires the addition of another backplane, and the switching of a configuration board along a different edge.

A physical view of a complete single backplane system 230 is shown in FIG. 17A. The system 230 includes control circuitry 232 and a processing structure 234. The control circuitry 232 includes maintenance circuitry for monitoring system conditions, configuration circuitry that provides actuator control signals to change the configuration of the processing structure 234, and other overhead features such as startup programs, diagnostics, and reset circuitry. The processing structure 234 includes a system such as that shown in FIG. 2 that is populated with modules. Cables connect the control circuitry 232 with the processing structure 234, to enable communication between the control circuitry 232 and the processing structure 234. Such communication is generally at a lower bandwidth than that used between modules 24 of the processing structure 234.

The system 230 is expandable in the Y-direction to form a larger system 236, as shown in FIG. 17B. Here, another backplane has been added to the single backplane processing structure 234, and one or more configuration boards 46 has been switched to its pass-through position to form links between the two backplanes to form a larger processing structure 238.

Alternatively, the system 230 is expandable in the X-direction to form a larger system 240, as shown in FIG. 17C. Here, another backplane has been added to the single backplane processing structure 234, and one or more configuration boards 46 has been switched to its pass-through position to form links between the two backplanes to form a larger processing structure 242.

Furthermore, the system 230 is expandable in multiple directions, as shown in FIG. 17D. Here, the system 230 is expanded in both the X and Y-directions by adding multiple backplanes in both directions to form a larger processing structure 244. As shown, the processing structure 244 is extended in the Y-direction by two arrays of backplanes 246 and 248. In particular the array of backplanes 248 is positioned behind the array of backplanes 246. The processing structure is extendable in this manner in the X-direction as well.

The system 230 includes special backplanes 252a, 252b and flexible extenders 250 to link the arrays 246 and 248. In FIG. 17D, the flexible extenders 250 are shown looping over from one backplane array to another, and may appear relatively long in length. However, it should be understood that the lengths of the extenders 250 can be kept short, and should be kept short to minimize propagation delays. Each special backplane 252 includes two row segments 44 of module connectors 42 rather than four (see FIG. 2). As such, a pair of special backplanes 252a, 252b and a flexible extender 250 provide equivalent electrical connections as that of the backplane 40 in FIG. 2. Use of this special assembly is convenient when space (e.g., computer room wall space or floor space) is limited. As shown in FIG. 17D, the bottom row of backplanes can be formed by half-backplanes 254. Accordingly, each array may include two rows of half-backplanes, one at the top and one at the bottom, such that each array is an even number of half-backplanes in length in the vertical direction (e.g., four half-backplanes).

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, it should be understood that the actuators 152 that move the configuration boards 46 may be electric motors. Each actuator and corresponding configuration board are considered to be a configuration controller since they can change the topology of the system. The actuators alternatively may be non-motorized devices such as mechanically operated lever or gear mechanisms.

Additionally, electronic switches may be substituted for the configuration boards 46 such that the end-around and pass-through electrical paths are provided by electrical switching rather than by mechanical switching.

Furthermore, the module arrangements are not limited to expansion in three dimensions. Rather, the module arrangements can be expanded in more or fewer dimensions by arranging the conducting paths within the backplanes to connect the module connectors 42 accordingly.

The remotely configurable interconnection described here is not limited to regular mesh or torus network topologies but can be applied to arbitrary network topologies. The network may be a multistage network such as a butterfly, a non-blocking network such as a Batcher, Benes, or Clos network, a tree network, or even an arbitrary irregular connection of modules and links. In each case, individually actuated configuration controllers can be used to incrementally extend the network.

What is claimed is:

1. A module connection assembly, comprising:
   a first backplane and a second backplane;
   a plurality of module connectors including a first set of module connectors for electrically connecting modules to the first backplane, and a second set of module connectors for electrically connecting modules to the second backplane; and
   a configuration controller that selects between end-around electrical paths that electrically connect multiple module connectors of the first set to each other, and pass-through electrical paths that electrically connect module connectors of the first set to module connectors of the second set.

2. The module connection assembly of claim 1 wherein the configuration controller includes:
   a configuration board that moves between an end-around position and a pass-through position relative to the first and second backplanes.

3. The module connection assembly of claim 2 wherein the configuration controller further includes:
   an actuator that moves the configuration board between the end-around position and the pass-through position.

4. The module connection assembly of claim 2 wherein the actuator is remotely controlled according to an actuator signal.

5. The module connection assembly of claim 2 further comprising:
   a backplate that physically supports the first and second backplanes such that the configuration board is disposed between the backplate and the first and second backplanes.

6. The module connection assembly of claim 1 wherein each of the end-around and pass-through electrical paths are cableless paths formed exclusively of rigid metallic material.

7. The module connection assembly of claim 1 further comprising:
   at least one additional configuration controller, each additional configuration controller selecting between end-around electrical paths that electrically connect multiple module connectors of the first set to each other, and pass-through electrical paths that electrically connect module connectors of the first set to module connectors of the second set.

8. The module connection assembly of claim 7 wherein the end-around electrical paths of each configuration controller forms a portion of a single link between two module connectors, and wherein the pass-through electrical paths of each configuration controller forms portions of two links between four module connectors.

9. The module connection assembly of claim 1 further comprising:
   at least one additional configuration controller, each additional configuration controller selecting between end-around electrical paths that electrically connect multiple module connectors of the first set to each other, and pass-through electrical paths that electrically connect module connectors of the first set to module connectors of a third set of module connectors that electrically connects modules to a third backplane.

10. The module connection assembly of claim 9 wherein the end-around electrical paths of each configuration controller form a portion of a single link between two module connectors, and wherein the pass-through electrical paths of each configuration controller form portions of two links between four module connectors.

11. The module connection assembly of claim 1 further comprising:
    modules that connect with the first and second backplanes through the plurality of module connectors.

12. The module connection assembly of claim 11 wherein each module is a fabric routing node such that a network router is formed.

13. The module connection assembly of claim 11 wherein each module is a data processing module such that a multicomputer system is formed.

14. A module connection assembly, comprising:
    a plurality of module connectors for connecting with modules;
    a backplane structure that provides a plurality of links which electrically connect the plurality of module connectors in a logical torus having multiple dimensions, each link being a cableless electrical path formed exclusively of rigid metallic material; and
    the backplane including a plurality of switches that are remotely controlled to electrically connect the plurality of module connectors in the logical torus, individual activation of one of the plurality of switches enabling the assembly to be expanded incrementally.

15. A module connection assembly, comprising:
    a plurality of module connectors for connecting with modules; and
    a backplane structure that provides a plurality of links which electrically connect the plurality of module connectors in a logical torus having multiple dimensions, each link being a cableless electrical path formed exclusively of rigid metallic material, each link including a pair of unidirectional channels, each channel carrying differential signals.

16. A module connection assembly, comprising:
    a plurality of module connectors for connecting with modules; and a backplane that provides a plurality of conducting paths for connecting the module connectors to each other in a torus with the conducting paths connected in an end-around manner, and for connecting the module connectors with another backplane to form torus connections with the conducting paths connected in a pass-through manner.

17. The module connection assembly of claim 16 wherein the backplane is adapted to connect with other backplanes to form a logical torus having three dimensions.

18. The module connection assembly of claim 16 wherein each cableless electrical path in a particular dimension has substantially the same length.

19. The module connection assembly of claim 16 wherein each cableless electrical path in a particular dimension includes bit paths having substantially the same lengths.

20. The module connection assembly of claim 16 wherein the backplane electrically connects the plurality of module connectors in an interleaved manner.

21. The module connection assembly of claim 20 wherein the module connectors are disposed physically in row segments on the backplane, and wherein the backplane is adapted to electrically connect the row segments in an interleaved manner when the backplane is connected with another backplane.

22. The module connection assembly of claim 20 wherein the module connectors are disposed physically in row segments on the backplane, and wherein the backplane electrically connects the module connectors within each row segment in an interleaved manner.

23. The module connection assembly of claim 20 wherein the module connectors are disposed physically in row segments on the backplane; wherein the row segments are disposed physically on the backplane structure in a two dimensional array; and wherein the backplane is adapted to electrically connect the row segments in an interleaved manner when the backplane is connected with another backplane, and wherein the backplane electrically connects the module connectors within each row segment in an interleaved manner such that the backplane electrically connects the plurality of module connectors in an interleaved manner in three dimensions.

24. The module connection assembly of claim 16 wherein the backplane provides a plurality of links when connected in the end-around and pass-through manners, each link having a pair of unidirectional channels, each channel carrying differential signals.

25. A module connection assembly, comprising:
a backplane;
a plurality of module connectors, coupled with the backplane, for connecting with modules; and
remotely configurable switches that configure a topology formed by the backplane and the plurality of module connectors, the remotely configurable switches including a plurality of separately movable boards, each movable board being movable to a position that incrementally expands the topology.

26. The module connection assembly of claim 25 wherein the plurality of separately movable boards are positioned along a periphery of the backplane such that each edge of the backplane is physically coupled to multiple movable boards.

27. A module connection assembly, comprising:
a backplane;
a plurality of module connectors, coupled with the backplane, for connecting with modules; and
remotely configurable switches that configure a topology formed by the backplane and the plurality of module connectors, each remotely configurable switch selectively connecting the backplane in an end-around manner and a pass-through manner.

28. A method for connecting modules, comprising the steps of:
providing sets of end-around connections to a first backplane to form a first topology, each set of end-around connections providing electrical paths between two modules electrically connected with the first backplane; and
remotely switching a set of end-around connections to a set of pass-through connections to form a second topology that is different than the first topology, the set of pass-through connections providing electrical paths between a module of the first backplane and a module of a second backplane.

29. The method of claim 28 wherein the step of providing the sets of end-around connections includes a step of:
positioning configuration boards in end-around positions relative the first backplane.

30. The method of claim 29, wherein the step of positioning the configuration boards in the end-around positions includes the step of:
aligning, for each configuration board, a set of pads on the configuration board, that electrically connect with end-around conductors in the configuration board, with pads on the first backplane.

31. A module connection assembly, comprising:
a plurality of module connectors for connecting with modules; and
a backplane structure that provides a plurality of links which electrically connect the plurality of module connectors in a logical torus having multiple dimensions, each link including a cableless electrical signal path formed exclusively of rigid metallic material, the backplane structure including a plurality of switches that are remotely controlled to electrically connect the plurality of module connectors in the logical torus, individual activation of one of the plurality of switches enabling the assembly to be expanded incrementally.

32. A module connection assembly, comprising:
a plurality of module connectors for connecting with modules; and
a backplane structure that provides a plurality of links which electrically connect the plurality of module connectors in a logical torus having multiple dimensions, each link including a cableless electrical signal path formed exclusively of rigid metallic material, each link including a pair of unidirectional channels, each channel carrying differential signals.

33. A module connection assembly, comprising:
a backplane;
a plurality of module connectors, coupled with the backplane, for connecting with modules; and
remotely configurable switches that reconfigure electrical signal paths of the backplane and the plurality of module connectors, the remotely configurable switches including a plurality of separately movable boards, each movable board being movable to a position that incrementally expands the topology.

34. The module connection assembly of claim 33 wherein the plurality of separately movable boards are positioned along a periphery of the backplane such that each edge of the backplane is physically coupled to multiple movable boards.

35. A module connection assembly, comprising:

a backplane;

a plurality of module connectors, coupled with the backplane, for connecting with modules; and remotely configurable switches that reconfigure electrical signal paths of the backplane and the plurality of module connectors, each remotely configurable switch selectively connecting the backplane in an end-around manner and a pass-through manner.

* * * * *